(12) United States Patent
Shirakawa et al.

(10) Patent No.: US 11,441,505 B2
(45) Date of Patent: Sep. 13, 2022

(54) INJECTION CONTROL DEVICE

(71) Applicant: DENSO CORPORATION, Kariya (JP)

(72) Inventors: Hiroaki Shirakawa, Kariya (JP); Masashi Inaba, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/126,484

(22) Filed: Dec. 18, 2020

(65) Prior Publication Data
US 2021/0189987 A1  Jun. 24, 2021

(30) Foreign Application Priority Data

Dec. 23, 2019  (JP) .............................. JP2019-231505

(51) Int. Cl.
*F02D 41/20* (2006.01)
*F02M 51/06* (2006.01)

(52) U.S. Cl.
CPC .......... *F02D 41/20* (2013.01); *F02M 51/061* (2013.01); *F02D 2041/202* (2013.01); *F02D 2041/2006* (2013.01); *F02D 2041/2041* (2013.01); *F02D 2041/2058* (2013.01)

(58) Field of Classification Search
CPC ............. F02D 41/20; F02D 2041/2006; F02D 2041/202; F02D 2041/2041; F02D 2041/2058; F02M 51/061
See application file for complete search history.

(56) References Cited

U.S. PATENT DOCUMENTS

| | | | | |
|---|---|---|---|---|
| 7,621,259 | B2 * | 11/2009 | Mayuzumi | F02D 41/20 361/155 |
| 8,081,498 | B2 * | 12/2011 | Mayuzumi | F02D 41/20 363/59 |
| 8,776,763 | B2 * | 7/2014 | Omori | F02D 41/20 123/445 |
| 2021/0189986 | A1 * | 6/2021 | Shirakawa | F02D 41/20 |
| 2021/0189988 | A1 * | 6/2021 | Shirakawa | F02D 41/20 |

FOREIGN PATENT DOCUMENTS

JP  2016-183597 A  10/2016

* cited by examiner

*Primary Examiner* — Hung Q Nguyen
*Assistant Examiner* — Mark L. Greene
(74) *Attorney, Agent, or Firm* — Posz Law Group, PLC

(57) ABSTRACT

An injection control device includes a boost controller performing boost control of a boosted voltage generated by a booster circuit until a boosted voltage, which is generated in a boost capacitor, rises to a full-charge threshold when the boosted voltage falls below a charge start threshold. When, for stopping a peak current by a drive unit, a power interruption controller interrupts electric current supplied to the fuel injection valve by the drive unit as interruption control (i) of an application voltage to a fuel injection valve or (ii) of a constant current by the drive unit, a regeneration unit regenerates electric current generated in the fuel injection valve to the boost capacitor of the booster circuit. The boost controller upward-shifts (i.e., raises) the full-charge threshold of the booster circuit.

18 Claims, 24 Drawing Sheets

FIG. 11

INJECTION CONTROL DEVICE

CROSS REFERENCE TO RELATED APPLICATION

The present application is based on and claims the benefit of priority of Japanese Patent Application No. 2019-231505, filed on Dec. 23, 2019, the disclosure of which is incorporated herein by reference.

TECHNICAL FIELD

The present disclosure generally relates to an injection control device that controls valve opening/closing of a fuel injection valve.

BACKGROUND INFORMATION

The injection control device opens and closes a fuel injection valve to inject fuel. The injection control device is configured to perform valve opening control by applying a high voltage to an electrically-operated fuel injection valve. Since the high voltage is required, the injection control device is equipped with a boost controller. That is, the boost controller boost-controls a battery voltage that is a reference power supply voltage of a power supply circuit, and applies the boosted voltage to the fuel injection valve to control the valve opening. When electric power is consumed by applying the boosted voltage to the fuel injection valve, the boosted voltage decreases. Therefore, the boost controller is configured to perform the boost control until the boosted voltage rises to a full-charge threshold when the boosted voltage falls below a charge start threshold.

However, when a regenerative current flows through a boost capacitor of the booster circuit, a floating voltage occurs due to the effect of an equivalent series resistor (ESR) of the boost capacitor. Then, the boosted voltage temporarily exceeds the full-charge threshold, and the boost controller stops the boost control before the boosted voltage reaches the full-charge threshold. As a result, the boosted voltage of the booster circuit is not sufficiently accumulated.

SUMMARY

It is an object of the present disclosure to provide an injection control device capable of preventing a boosted voltage from temporarily exceeding a full-charge threshold when a regenerative current flows.

BRIEF DESCRIPTION OF THE DRAWINGS

Objects, features, and advantages of the present disclosure will become more apparent from the following detailed description made with reference to the accompanying drawings, in which:

FIG. 11 is a diagram schematically illustrating the control contents in the control circuit according to the fifth embodiment;

DETAILED DESCRIPTION

Figure 1:
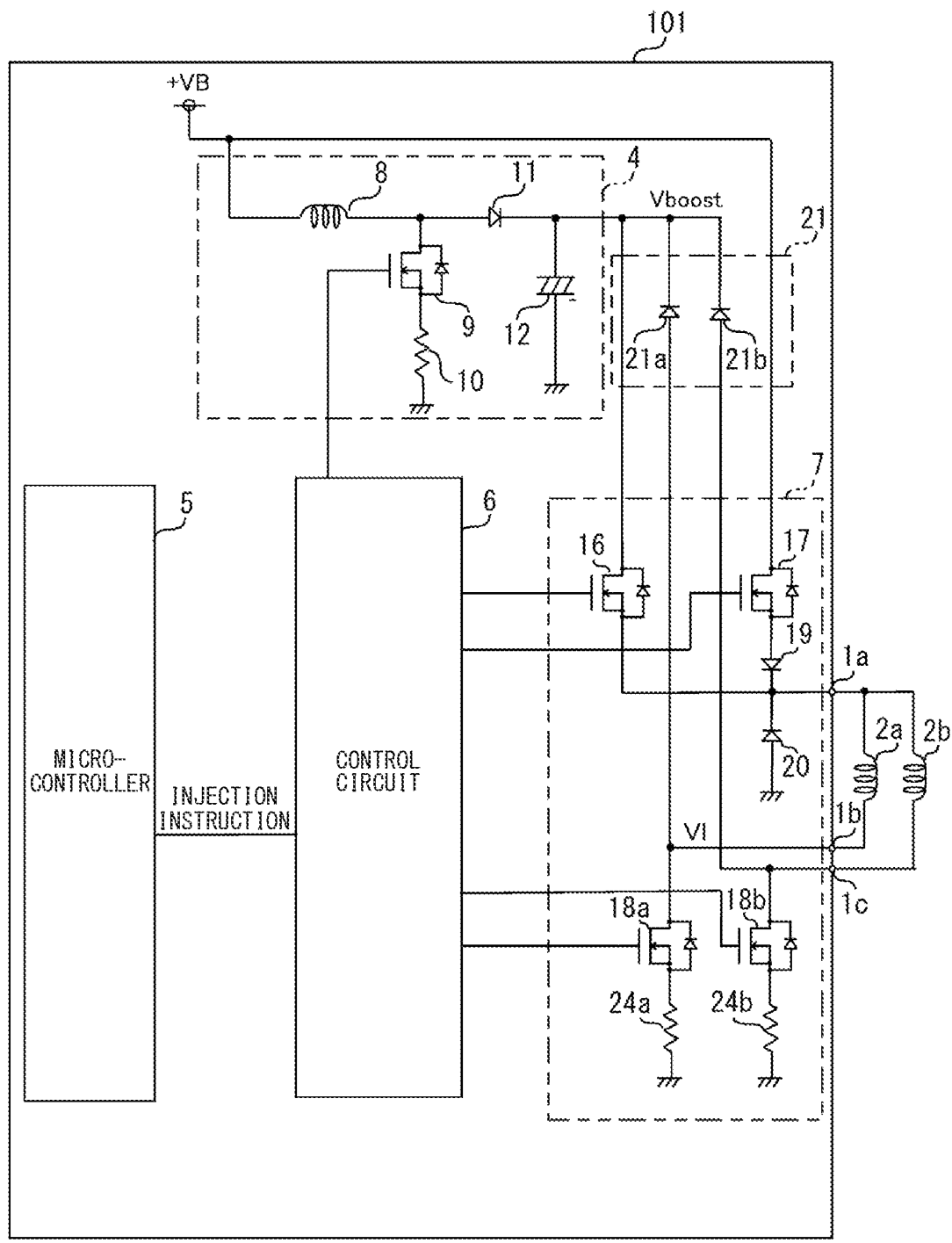
FIG. 1 is an electrical configuration diagram of an electronic control device according to a first embodiment.

Embodiments are described with reference to the drawings.

In each of the embodiments described below, the same or similar reference numerals are used to designate the same or similar configurations, and redundancy of description of the similar configurations is eliminated as required.

First Embodiment

As illustrated in FIG. 1, an electronic control device 101 is used to drive an injector including, for example, N pieces of fuel injection valves 2a and 2b of a solenoid type for injecting/supplying fuel to an N-cylinder internal combustion engine mounted on a vehicle such as an automobile. The electronic control device 101 has a function as an injection control device that controls the injection by supplying an electric current to the fuel injection valves 2a and 2b.

The electronic control device 101 is configured to include a booster circuit 4, a microcomputer or microcontroller 5 that outputs an injection instruction signal, a control circuit 6, and a drive unit 7. The booster circuit 4 is composed of, for example, an inductor 8, a MOS transistor 9 serving as a switching element, a current detection resistor 10, a diode 11, and a DCDC converter using a boost chopper circuit having a boost capacitor 12 in the illustrated form. The booster circuit 4 boosts a power supply voltage VB based on a battery voltage to generate a boosted voltage Vboost in the boost capacitor 12. The configuration of the booster circuit 4 is not limited to the illustrated form shown in FIG. 1. Instead, various forms can be applied.

The microcomputer 5 is configured to include a CPU, a ROM, a RAM, an I/O, etc. (none of which is shown), and performs various processing operations based on programs stored in the ROM. The microcomputer 5 calculates an injection instruction timing based on a sensor signal from a sensor (not shown) provided outside of the electronic control device 101, and outputs a fuel injection instruction signal to the control circuit 6 at such injection instruction timing.

The control circuit 6 is, for example, an integrated circuit device based on ASIC (Application Specific Integrated Circuit), and includes, for example, (i) a controller such as a logic circuit, a CPU and the like, and (ii) a storage unit such as RAM, ROM, and EEPROM (both of which are not shown), (iii) a comparison unit including a comparator, and the like, and is configured to execute various controls based on hardware and software.

Figure 2:
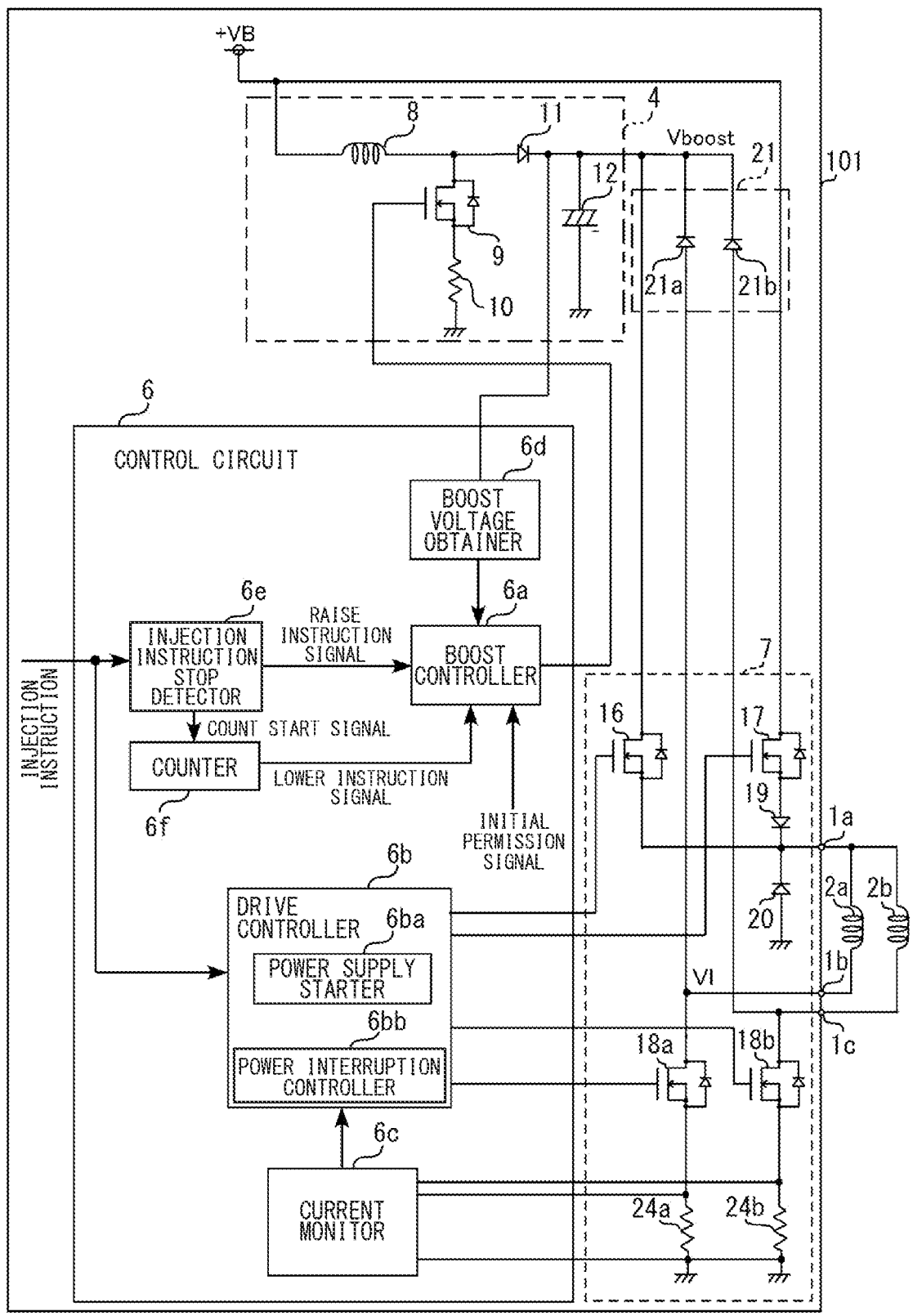
FIG. 2 is a diagram schematically illustrating control contents in a control circuit according to the first embodiment.

As illustrated in a diagram of control contents of FIG. 2, the control circuit 6 provides various functions such as a function of a boost controller 6a that controls voltage boosting by the booster circuit 4, a function of a drive controller 6b that controls the drive of the drive unit 7, a function of a current monitor 6c that monitors the electric currents of the fuel injection valves 2a and 2b, a function of a boost voltage obtainer 6d, a function of an injection instruction stop detector 6e, and a function of a counter 6f.

When the power supply voltage VB is applied to the microcomputer 5 and the control circuit 6, the boost controller 6a, upon receiving an input of an initial permission signal, obtains a voltage between an upper node of the boost capacitor 12 and a ground node via the boost voltage obtainer 6d as well as detecting an electric current flowing in the current detection resistor 10 via a boost current monitor (not shown), and performs ON/OFF control of the MOS transistor 9, for a boost control of the booster circuit 4.

The boost controller 6a performs ON/OFF switching control of the MOS transistor 9 of the booster circuit 4 shown in FIG. 1, thereby rectifying the electric current energy accumulated in the inductor 8 through the diode 11 and supplying the electric current energy to the boost capacitor 12. The boost capacitor 12 is charged with the boosted voltage Vboost.

The boost controller 6a obtains the boosted voltage Vboost by monitoring the voltage between the anode of the boost capacitor 12 and the ground node by the boost voltage obtainer 6d, and starts the boost control when the boosted voltage Vboost falls below a predetermined charge start threshold Vtl (FIG. 3), and continues the boost control until the boosted voltage Vboost reaches a full-charge threshold Vhl that is set to be higher than the charge start threshold Vtl. In such manner, normally, the boost controller 6a can output the boosted voltage Vboost while controlling the boosted voltage Vboost close to the full-charge threshold Vhl.

The drive controller 6b controls energization of an electric current in order to open and close the fuel injection valves 2a and 2b, and performs ON/OFF control of a discharge switch 16, a constant current switch 17, and a low-side drive switches 18a and 18b while detecting the electric current flowing through the fuel injection valves 2a and 2b by the current monitor 6c. The drive controller 6b has functions as a power supply starter 6ba and a power interruption controller 6bb. The power supply starter 6ba performs control when starting energization (i.e., when starting supply of electric power), and the power interruption controller 6bb performs control when cutting off or stopping energization (i.e., when stopping supply of electric power).

As shown in FIGS. 1 and 2, the drive unit 7 includes, as its main components, the discharge switch 16 for turning ON/OFF the boosted voltage Vboost to the fuel injection valves 2a and 2b, the constant current switch 17 for performing a constant current control using the power supply voltage VB and the low-side drive switches 18a and 18b.

As shown in FIG. 1, the drive unit 7 is configured by connecting other peripheral circuits, such as a diode 19, a reflux diode 20 and current detection resistors 24a and 24b in the illustrated form, for example. The drive unit 7 applies the boosted voltage Vboost to the fuel injection valves 2a and 2b to increase the supply of electric current up to a peak current threshold Ip for valve opening, and then supplies a constant current that is set to be lower than the peak current threshold Ip. The current monitor 6c of the control circuit 6 shown in FIG. 2 detects the electric current flowing through the electric current detection resistors 24a and 24b. Further, the regeneration unit 21 is configured by connecting the diodes 21a and 21b in the form shown in FIG. 1.

The discharge switch 16, the constant current switch 17, and the low-side drive switches 18a and 18b are configured, i.e., made of, using, for example, n-channel type MOS transistors. Although these switches 16, 17, 18a, and 18b may be configured by using other types of transistors (for example, bipolar transistors), the present embodiment describes an example where these switches are made by using n-channel type MOS transistors.

Hereinafter, the circuit configuration example shown in FIG. 1 is described, in which the drain, the source, and the gate of the discharge switch 16 respectively mean a drain, a source, and a gate of a MOS transistor serving as the discharge switch 16. Similarly, when described as a drain, a source, and a gate of the constant current switch 17, that means a drain, a source, and a gate of a MOS transistor that constitutes the constant current switch 17, respectively. Similarly, when described as drains, sources, and gates of the low-side drive switches 18a and 18b, they mean the drains, the sources, and the gates of the MOS transistors serving as the low-side drive switches 18a and 18b, respectively.

The boosted voltage Vboost is supplied from the booster circuit 4 to the drain of the discharge switch 16. The source of the discharge switch 16 is connected to a high side terminal 1a, and the gate of the discharge switch 16 receives a control signal from the drive controller 6b (see FIG. 2) of the control circuit 6. In such manner, the discharge switch 16 can supply the boosted voltage Vboost of the booster circuit 4 to a high-side terminal 1a under the control of the drive controller 6b of the control circuit 6.

The power supply voltage VB is supplied to the drain of the constant current switch 17. The source of the constant current switch 17 is connected to the high-side terminal 1a via the diode 19 in the forward direction. A control signal is applied to the gate of the constant current switch 17 from the drive controller 6*b* of the control circuit 6. In such manner, the constant current switch 17 can energize the high-side terminal 1*a* with the power supply voltage VB under the control of the drive controller 6*b* of the control circuit 6.

The diode 19 is connected to prevent backflow from an output node of the boosted voltage Vboost of the booster circuit 4 to an output node of the power supply voltage VB of the booster circuit 4 when both switches 16 and 17 are turned ON. The reflux diode 20 is reversely connected at a position between the high-side terminal 1*a* and the ground node. The reflux diode 20 is connected to a path for returning an electric current when the fuel injection valves 2*a* and 2*b* are turned OFF (i.e., when an electric current through these is interrupted).

The fuel injection valves 2*a* and 2*b* are connected at positions between the high-side terminal 1*a* and low-side terminals 1*b* and 1*c*, respectively. At a position between the low-side terminal 1*b* and the ground node, the drain and source of the low-side drive switch 18*a* and the electric current detection resistor 24*a* are connected in series. At a position between the low-side terminal 1*c* and the ground node, the drain and source of the low-side drive switch 18*b* and the electric current detection resistor 24*b* are connected in series. The current detection resistors 24*a* and 24*b* are provided for detecting the electric current supplied to the fuel injection valves 2*a* and 2*b*, which are respectively set to about 0.03Ω, for example.

The sources of the low-side drive switches 18*a* and 18*b* are connected to the ground node through the electric current detection resistors 24*a* and 24*b*, respectively. The gates of the low-side drive switches 18*a* and 18*b* are connected to the drive controller 6*b* of the control circuit 6. In such manner, the low-side drive switches 18*a* and 18*b* can selectively switch energization of the electric current flowing through the fuel injection valves 2*a* and 2*b* under the control of the drive controller 6*b* of the control circuit 6.

Further, the diodes 21*a* and 21*b* of the regeneration unit 21 are connected at positions between the low-side terminals 1*b* and 1*c* and the output node of the boosted voltage Vboost by the booster circuit 4, respectively. The diodes 21*a* and 21*b* of the regeneration unit 21 are connected to an energization path of the regenerative currents flowing through the fuel injection valves 2*a* and 2*b* when the fuel injection valves 2*a* and 2*b* are de-energized (i.e., when power supply to the valves 2*a* and 2*b* is interrupted), for regeneration of the electric current to the boost capacitor 12. As a result, the diodes 21*a* and 21*b* are configured to be able to regenerate an electric current to the boost capacitor 12 of the booster circuit 4 when the fuel injection valves 2*a* and 2*b* are de-energized (i.e., when power supply to the valves 2*a* and 2*b* is interrupted).

The characteristic operation of the above basic configuration is described below. When the power supply voltage VB based on the battery voltage is applied to the electronic control device 101, the microcomputer 5 and the control circuit 6 are activated. When the control circuit 6 outputs the initial permission signal to the boost controller 6*a*, the boost controller 6*a* outputs a boost control pulse to the gate of the MOS transistor 9 to control ON/OFF of the MOS transistor 9. When the MOS transistor 9 turns ON, an electric current flows through the inductor 8, the MOS transistor 9, and the electric current detection resistor 10. When the MOS transistor 9 is turned OFF, an electric current based on the energy stored in the inductor 8 flows through the diode 11 to the boost capacitor 12, and the voltage across the terminals of the boost capacitor 12 rises.

When the boost controller 6*a* of the control circuit 6 repeats the ON/OFF control of the MOS transistor 9 by outputting the boost control pulse, the boosted voltage Vboost charged in the boost capacitor 12 exceeds the power supply voltage VB. After that, the boosted voltage Vboost of the boost capacitor 12 reaches the full-charge threshold Vh1 (≈65V) which is higher than a predetermined voltage higher than the power supply voltage VB. The boost controller 6*a* obtains the boosted voltage Vboost by the boost voltage obtainer 6*d* and stops outputting the boost control pulse when detecting that the boosted voltage Vboost reaches the full-charge threshold Vh1. As a result, the boosted voltage Vboost is maintained near, i.e., close to, the full-charge threshold Vh1 (see timing t1 in FIG. 3).

Figure 3:
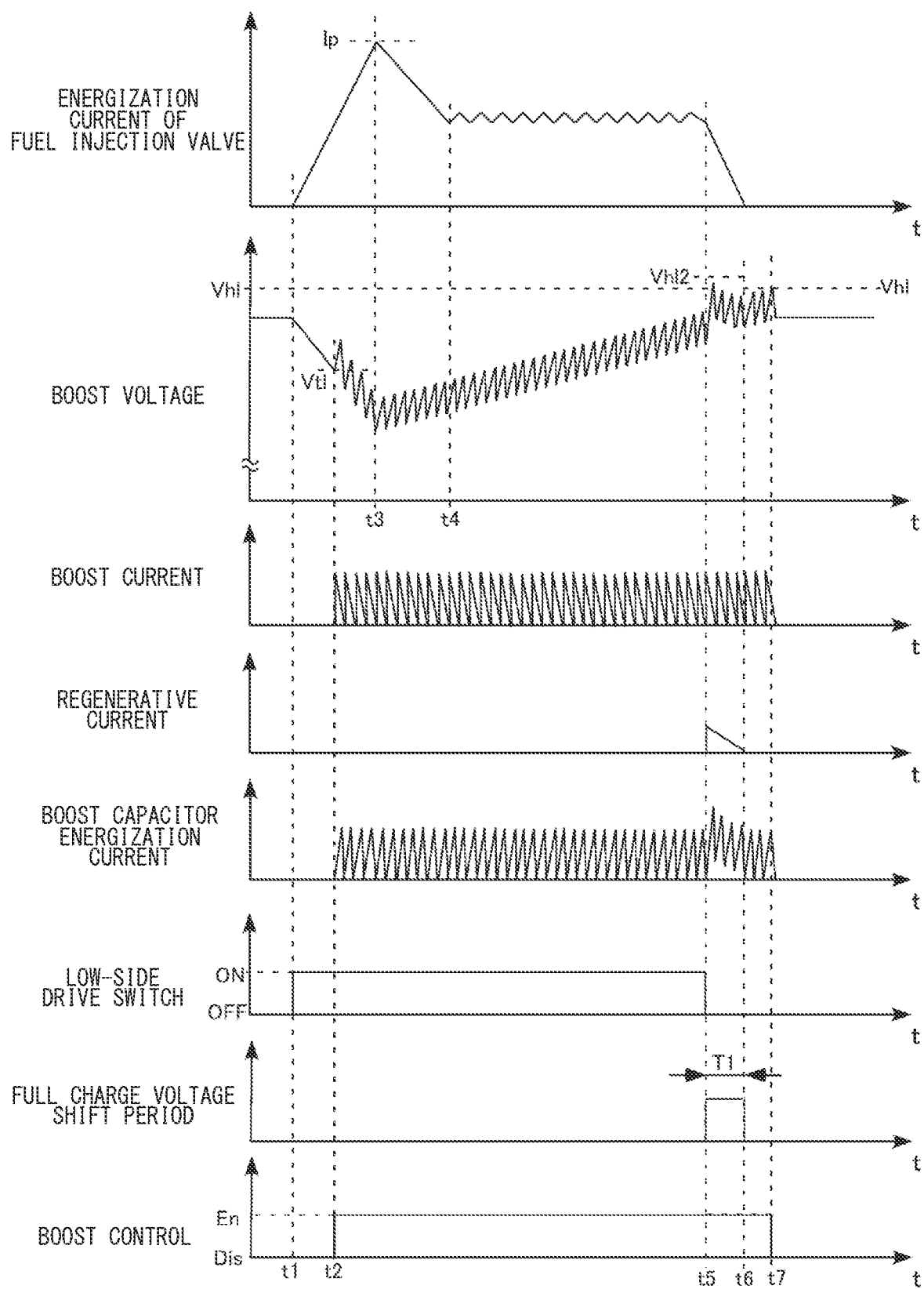
FIG. 3 is a timing chart schematically showing a signal change of each part according to the first embodiment.

When the microcomputer 5 outputs an injection start instruction of the injection instruction signal of the fuel injection valve 2*a* to the control circuit 6 at timing t1 in FIG. 3, for example, the drive controller 6*b* of the control circuit 6 causes the power supply starter 6*ba* to perform an ON control of the low-side switch 18*a*, and to perform an ON control of the discharge switch 16. The discharge switch 16 is not shown in FIG. 3. At such timing, the boosted voltage Vboost is applied to a position between the high-side terminal 1*a* and the low-side terminal 1*b* of the fuel injection valve 2*a*, thereby steeply increases the energizing current of the fuel injection valve 2*a*. As a result, the charge accumulated in the boost capacitor 12 is consumed by the electric current flowing through the fuel injection valve 2*a*, and the boosted voltage Vboost decreases. Thus the fuel injection valve 2*a* starts to open.

When the boosted voltage Vboost reaches the charge start threshold Vtl, the boost controller 6*a* detects that the inter-terminal voltage (i.e., a voltage across the terminals) of the boost capacitor 12 has reached the charge start threshold Vtl by the boost voltage obtainer 6*d*, and outputs the boost control pulse to the MOS transistor 9, for starting the boost control (i.e., timing t2 in FIG. 3).

The current monitor 6*c* continues to detect the electric current flowing through the fuel injection valve 2*a* by detecting the voltage across the electric current detection resistor 24*a*. When the drive controller 6*b* detects that the detected current of the current monitor 6*c* has reached a predetermined constant current upper limit threshold, the drive controller 6*b* controls the power interruption controller 6*bb* to perform an OFF control of the constant current switch 17. After that, when the drive controller 6*b* detects that the peak current threshold Ip is reached, the drive controller 6*b* performs an OFF control of the discharge switch 16 by the power interruption controller 6*bb* to shut off (i.e., interrupt) the voltage applied to the fuel injection valve 2*a* (while the constant current switch 17 remains OFF) (i.e., timing t3 in FIG. 3).

At timing t3, the electric current flowing through the fuel injection valve 2*a* is suddenly interrupted, and the boosted voltage Vboost starts to rise after timing t3. The boost controller 6*a* outputs a boost control pulse until the boosted voltage Vboost reaches the full-charge threshold Vh1. Refer to timings t3 to t7 in FIG. 3 for such control.

Further, between timings t4 and t5 in FIG. 3, the drive controller 6*b* performs an ON/OFF control of the constant current switch 17 to control the energization current of the fuel injection valve 2*a* as a predetermined constant current based on the detection current of the current monitor 6*c*. The value of such constant current is adjusted according to the ON/OFF of the constant current switch 17, and both of the maximum value and the minimum value that define the constant current range are set in advance so as to fall below the peak current threshold Ip. Thereby, the drive controller 6b can control the electric current flowing through the fuel injection valve 2a to be a constant current within a certain range.

At timing t5 of FIG. 3, when the microcomputer 5 outputs an injection instruction stop signal of the fuel injection valve 2a to the control circuit 6, the power interruption controller 6bb of the drive controller 6b interrupts the constant current by performing an OFF control for both of the constant current switch 17 and the low-side drive switch 18a. In such case, the energization current of the fuel injection valve 2a sharply decreases, and the magnetization of a stator provided in the fuel injection valve 2a can be stopped. As a result, a needle inside the fuel injection valve 2a, which is attracted by an electro-magnet of the stator, is returned to its original position by a biasing force of a biasing unit in response to the disappearance of the electromagnetic force, and as a result, the fuel injection valve 2a is closed.

At timing t5 in FIG. 3, an electric current is being supplied to the fuel injection valve 2a, and an electric energy is accumulated therein. The regeneration unit 21 can supply a regenerative current based on the accumulated energy to the boost capacitor 12 through the reflux diode 20 and the diode 21a. The boosted voltage Vboost of the boost capacitor 12 is charged with the electric energy based on the regenerative current of the regeneration unit 21, and the energy accumulated in the fuel injection valve 2a can be reused.

On the other hand, when the control circuit 6 receives the injection instruction stop signal from the microcomputer 5, the injection instruction stop detector 6e detects the stop of the injection instruction. The injection instruction stop detector 6e outputs a raise instruction signal to the boost controller 6a to shift the full-charge threshold Vhl of the boost controller 6a upward to a (shifted, or raised, or temporary) full-charge threshold Vhl2, and outputs a count start signal to the counter 6f for a start of counting of the counter 6f.

The counter 6f continues counting when the count start signal is input, but outputs a lowering instruction signal to the boost controller 6a when the count reaches a predetermined count threshold. That is, the counter 6f outputs the lowering instruction signal to the boost controller 6a after a lapse of a predetermined first period T1 of timings t5 to t6. The boost controller 6a returns (i.e., shifts) the full-charge threshold Vhl2 down to the full-charge threshold Vhl by such shifting of the threshold.

In the predetermined first period T1, when the regeneration unit 21 regenerates the electric current to the boost capacitor 12 of the booster circuit 4, the boost controller 6a shifts, i.e., raises, the full-charge threshold Vhl to set the full-charge threshold Vhl2. Therefore, the boost controller 6a can continue the boost control even during the predetermined first period T1 without (i.e., by avoiding) the boosted voltage Vboost temporarily exceeding the full-charge threshold Vhl. Further, since the full-charge threshold Vhl is shifted upward, i.e., increased, to the full-charge threshold Vhl2, it is possible to prevent the boost controller 6a from exceeding the full-charge threshold Vhl2 even if the boost control is continued. The appropriate full-charge threshold Vhl2 may be determined from system requirements and/or the absolute maximum rating of the boost capacitor 12.

Since the predetermined first period T1 is determined as a time required for the regenerative current to sufficiently decrease, the boosted voltage Vboost reaching/exceeding the full-charge threshold Vhl2 due to the regenerative current temporarily flowing into the equivalent series resistor of the boost capacitor 12 (ESR) is prevented in the predetermined first period T1. See the predetermined first period T1 from timing t5 to t6 in FIG. 3.

When the lowering instruction signal is input from the counter 6f at timing t6, the boost controller 6a continues the boost control while shifting the full-charge threshold Vhl2 down to the full-charge threshold Vhl. Then, at timing t7 in FIG. 3, when the boosted voltage Vboost reaches the full-charge threshold Vhl, the boost controller 6a stops the boost control by stopping the output of the boost control pulse.

If the boost controller 6a maintains the full-charge threshold Vhl without changing it in the predetermined first period T1, a floating voltage occurs due to the effect of the equivalent series resistor (ESR) of the boost capacitor 12, which causes the detected voltage of the voltage Vboost to temporarily reach the full-charge threshold Vhl, thereby the boost controller 6a may stop the boost control. In such case, the boosted voltage Vboost is not sufficiently accumulated/stored in the boost capacitor 12.

Therefore, in the present embodiment, during the predetermined first period T1, the boost controller 6a temporarily shifts the full-charge threshold Vhl upward to set it to the (shifted or raised or temporary) full-charge threshold Vhl2. Therefore, during a period between timing t5 to t6 shown in FIG. 3, even if the boosted voltage Vboost temporarily rises due to the influence of the equivalent series resistor of the boost capacitor 12, it is prevented from reaching the full-charge threshold Vhl2 and the boost control may be continued. Thus, specifications of the boost capacitor 12 and the circuit elements existing in the boosting path can be lowered, thereby decreasing the manufacturing cost of the circuit.

According to the present embodiment, the boost controller 6a sets the full-charge threshold Vhl2 by temporarily shifting the full-charge threshold Vhl upward only for the predetermined first period T1 from a time when the power interruption controller 6bb performs the cutoff control, for achieving/enabling the above-described effects. An appropriate duration of the predetermined first period T1 may vary depending on the structure of the fuel injection valves 2a and 2b as well as individual differences thereof and the like. Thus, the predetermined first period T1 may be set or adjusted to an optimum value during manufacturing or inspection.

Second Embodiment

Figure 4:
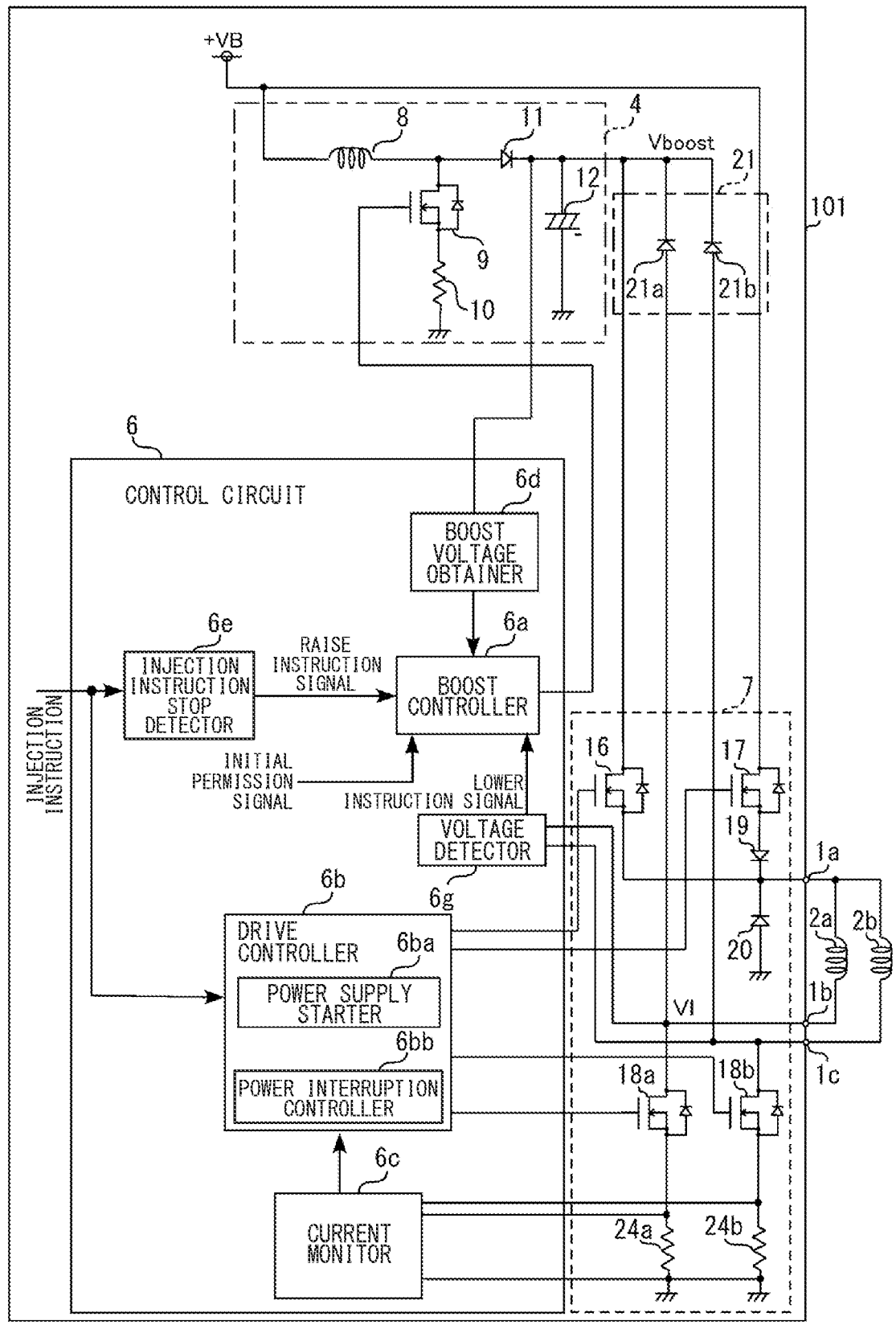
FIG. 4 is a diagram schematically illustrating the control contents in the control circuit according to a second embodiment.
Figure 5:
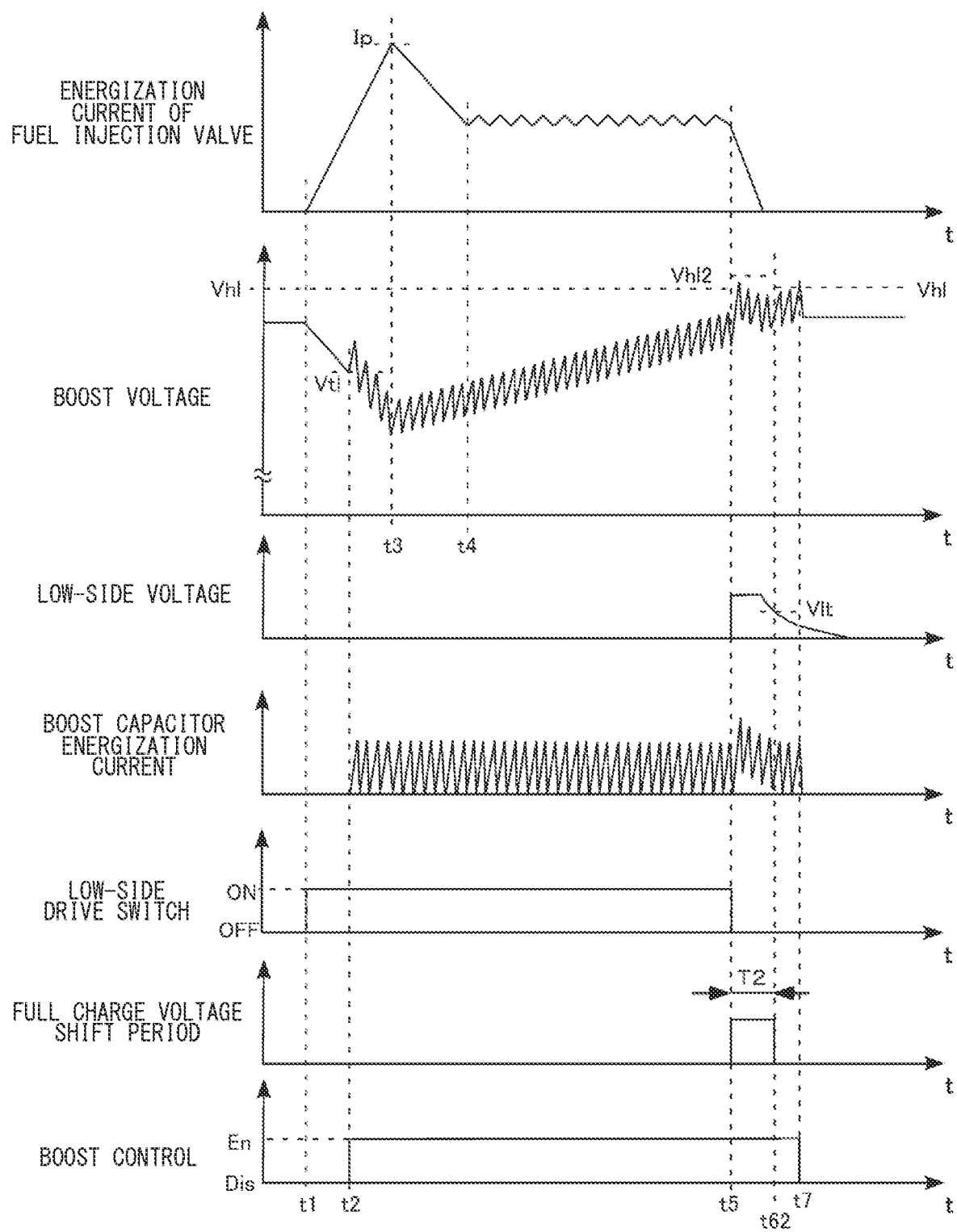
FIG. 5 is a timing chart schematically showing a signal change of each part according to the second embodiment.

FIGS. 4 and 5 show additional explanatory diagrams of the second embodiment. The same parts as those in the above-described embodiment are designated by the same reference numerals and the description thereof is omitted. Below, the parts different from the above-described embodiment is described.

As shown in FIG. 4, the control circuit 6 includes a voltage detector 6g that detects a low-side voltage Vl of the low-side terminals 1b and 1c. The voltage detector 6g detects a flyback voltage generated in the fuel injection valves 2a and 2b when the power interruption controller 6bb interrupts, or cuts off the constant current (i.e., when performing an interruption control of the constant current).

As shown in FIG. 5, the low-side voltage Vl of the low-side terminals 1b and 1c rises sharply from timing t5 at which the control circuit 6 inputs an injection stop instruction and the interruption control is performed by the power interruption controller 6bb and then the low-side voltage Vl is saturated. After that, when the regenerative current stops flowing, the low-side voltage Vl also gradually decreases. Therefore, after the injection instruction stop detector 6e outputs a raise instruction signal to the boost controller 6a in response to the injection stop instruction being input thereto, the voltage detector 6g outputs, to the boost controller 6a, a lowering instruction signal upon detecting a fall of the low-side voltage Vl below the predetermined first voltage Vlt at timing t62 (see FIG. 5). Then, the boost controller 6a shifts the full-charge threshold Vhl upward to the full-charge threshold Vhl2 in a full-charge voltage shift period T2 between timings t5 and t62. After that, the boost controller 6a shifts the full-charge threshold Vhl2 downward from timing t62 when the full-charge voltage shift period T2 has ended, and returns it to the original full-charge threshold Vhl.

According to the present embodiment, the voltage boost controller 6a shifts (temporarily increases) the full-charge threshold Vhl upward during a period (i) from a timing of when the power interruption controller 6bb performs the interruption control (ii) until it is detected by the voltage detector 6g that the flyback voltage generated in the fuel injection valves 2a and 2b falls below the predetermined first voltage Vlt. As a result, the same effect as that of the above-described embodiment is obtained.

Third Embodiment

Figure 6:
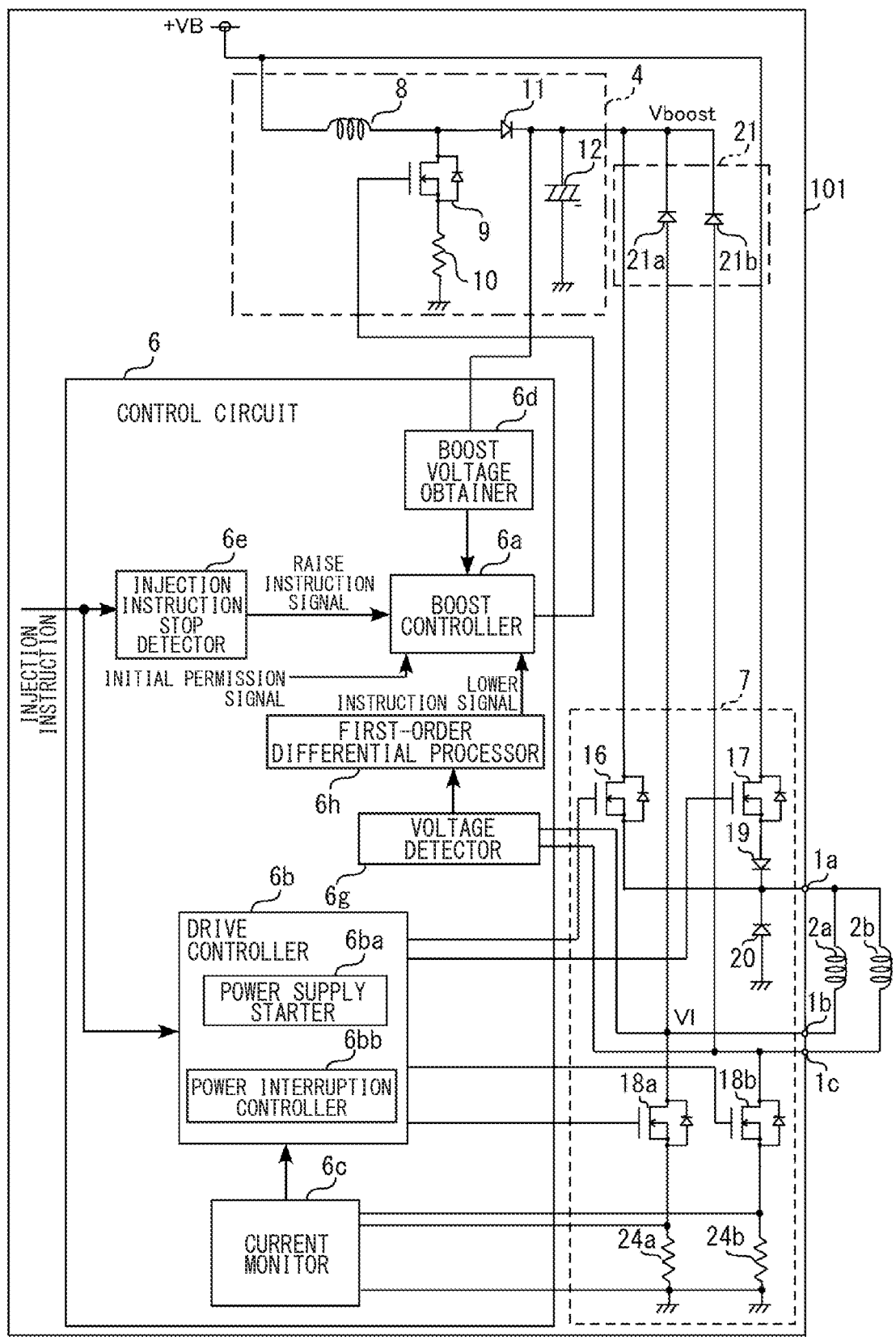
FIG. 6 is a diagram for schematically illustrating the control contents in the control circuit according to a third embodiment.
Figure 7:
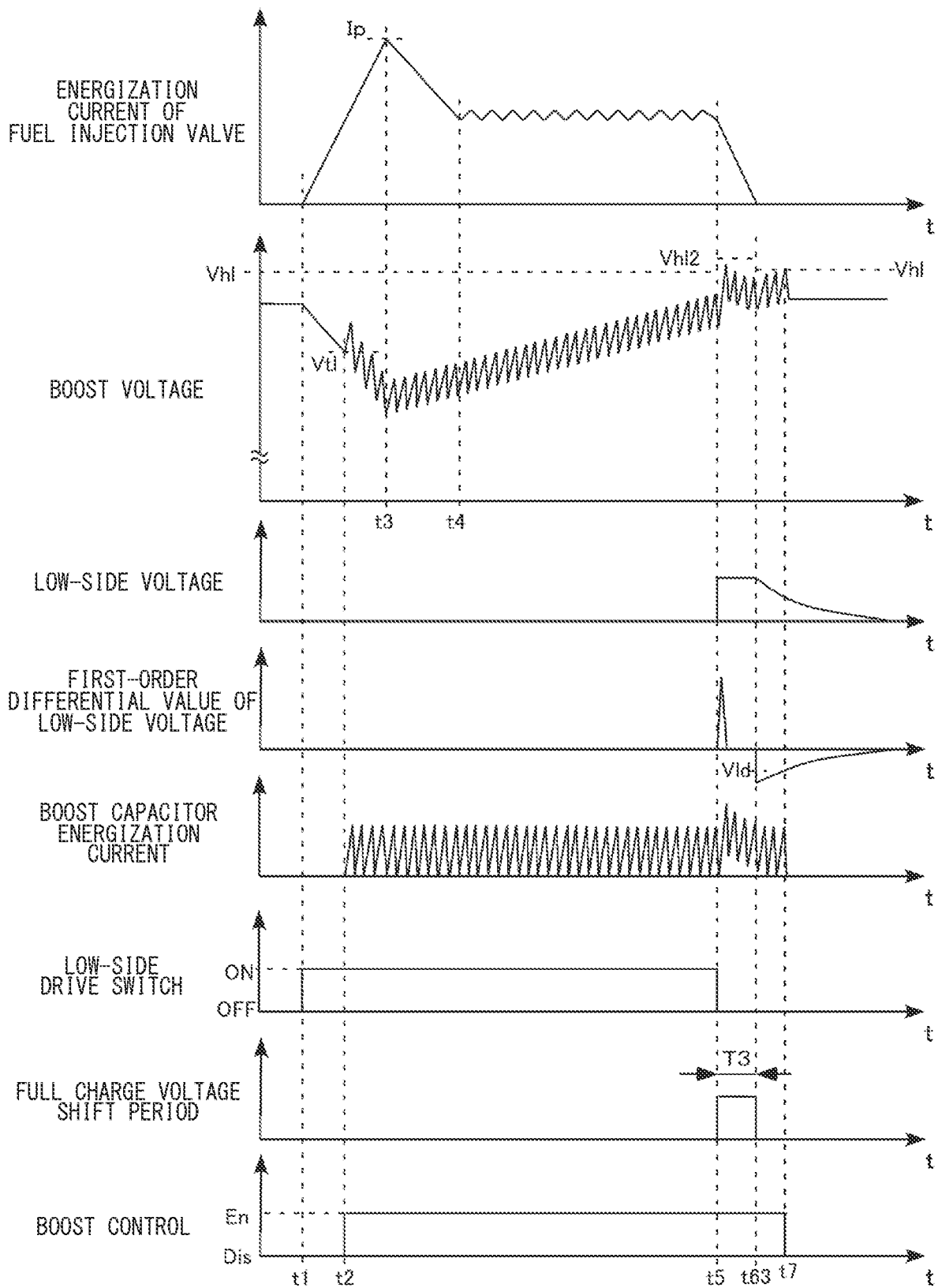
FIG. 7 is a timing chart schematically showing a signal change of each part according to the third embodiment.

FIGS. 6 and 7 show additional explanatory diagrams of the third embodiment. The same parts as those in the above-described embodiment are designated by the same reference numerals and the description thereof is omitted. Below, the parts different from the above-described embodiment is described.

As shown in FIG. 6, the control circuit 6 includes the voltage detector 6g that detects the low-side voltage Vl of the low-side terminals 1b and 1c. The voltage detector 6g detects a flyback voltage generated in the fuel injection valves 2a and 2b when the power interruption controller 6bb interrupts, or cuts off the constant current (i.e., when performing an interruption control of the constant current). The control circuit 6 further includes a first-order differential processor 6h. The first-order differential processor 6h differentiates the flyback voltage detected by the voltage detector 6g once, and outputs a lowering instruction signal to the boost controller 6a when the differential value satisfies a predetermined condition.

As shown in FIG. 7, the low-side voltage Vl of the low-side terminals 1b and 1c rises sharply from timing t5 when the control circuit 6 inputs the injection stop instruction and the interruption control is performed by the power interruption controller 6bb, and is saturated. After that, when the regenerative current stops flowing, the low-side voltage Vl also gradually decreases. On the other hand, the first-order differential processor 6h calculates the processed value of the first-order differential voltage according to the change in the low-side voltage Vl.

Therefore, after the injection instruction stop detector 6e outputs a raise instruction signal to the boost controller 6a in response to the injection stop instruction being input thereto, when the voltage detector 6g detects (i) that the low-side voltage Vl is saturated to the maximum value, and thereafter (ii) at timing t63 (see FIG. 7) that the processed value of the first-order differential voltage obtained by differentiating the low-side voltage Vl once by the first-order differential processor 6h falls below (i.e., reaches) a predetermined negative threshold Vld, a lowering instruction signal is output to the boost controller 6a. Then, the boost controller 6a shifts the full-charge threshold Vhl upward to set it to the full-charge threshold Vhl2 in the full-charge voltage shift period T3 between timings t5 and t63. After that, the boost controller 6a performs a downward shift of the threshold from the full-charge threshold Vhl2 at timing t63 when a full-charge voltage shift period T3 has lapsed, to return to the original full-charge threshold Vhl.

According to the present embodiment, the boost controller 6a performs an upward shift of the full-charge threshold Vhl from (i) the interruption control by the power interruption controller 6bb (ii) until the differential voltage processed value of the flyback voltage generated in the fuel injection valves 2a and 2b by the first-order differential processor 6h satisfies a predetermined condition. As a result, the same effect as that of the above-described embodiment is obtained.

Fourth Embodiment

Figure 8:
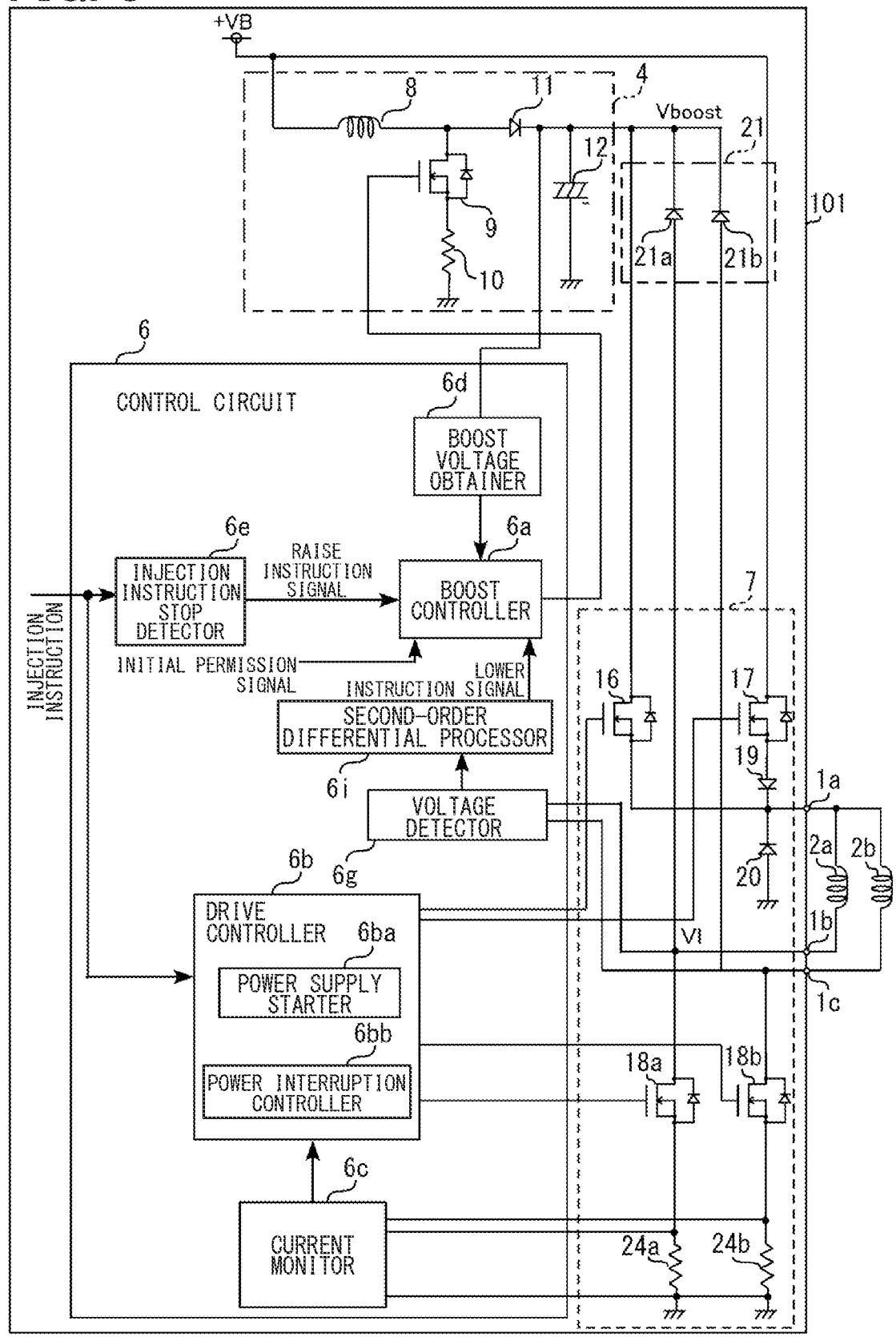
FIG. 8 is a diagram schematically illustrating the control contents in the control circuit according to a fourth embodiment.
Figure 9:
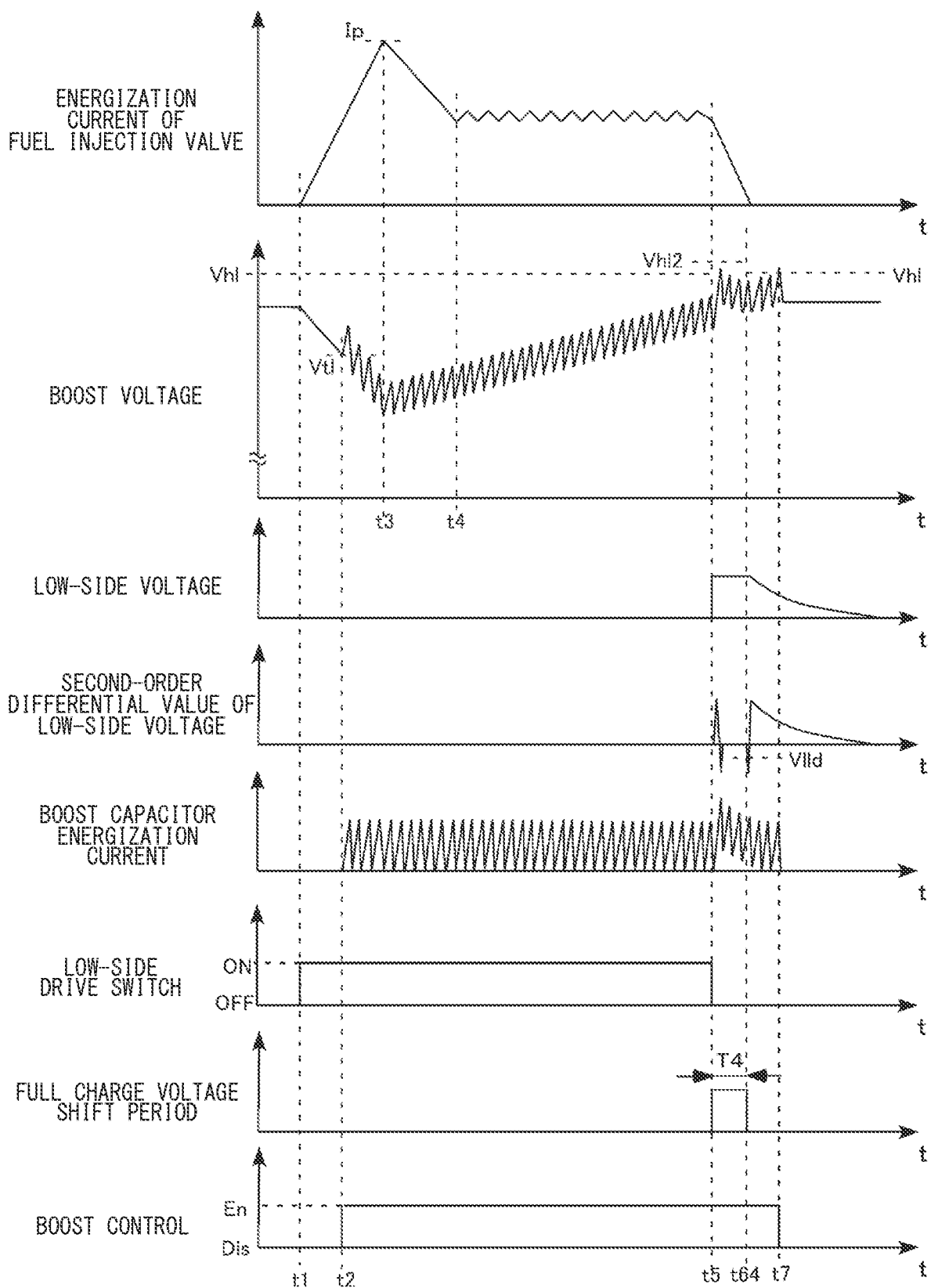
FIG. 9 is a timing chart schematically showing a signal change of each part according to the fourth embodiment.

FIGS. 8 and 9 show additional explanatory diagrams of the second embodiment. The same parts as those in the above-described embodiment are designated by the same reference numerals and the description thereof is omitted. Below, the parts different from the above-described embodiment is described.

As shown in FIG. 8, the control circuit 6 includes the voltage detector 6g that detects the low-side voltage Vl of the low-side terminals 1b and 1c. The voltage detector 6g detects the flyback voltage generated in the fuel injection valves 2a and 2b when the interruption control by the power interruption controller 6bb is performed. In addition, the control circuit 6 further includes a second-order differential processor 6i. The second-order differential processor 6i differentiates the flyback voltage detected by the voltage detector 6g twice, and outputs a lowering instruction signal to the boost controller 6a when the differential value satisfies a predetermined condition.

As shown in FIG. 9, the low-side voltage Vl of the low-side terminals 1b and 1c rises sharply from timing t5 at which the control circuit 6 inputs the injection stop instruction signal and the interruption control is performed by the power interruption controller 6bb, and the low-side voltage Vl is saturated. After that, when the regenerative current stops flowing, the low-side voltage Vl also gradually decreases. On the other hand, the second-order differential processor 6i calculates the processed value of the second-order differential voltage according to the change in the low-side voltage Vl.

After the injection instruction stop detector 6e outputs a raise instruction signal to the boost controller 6a in response to the injection stop instruction being input, the voltage detector 6g detects that the low-side voltage Vl is saturated to the maximum value. After that, the second-order differential processor 6i, upon determining that the processed value of the second-order differential voltage (i) becomes the maximum and minimum value and (ii) is below (reached) a predetermined negative threshold Vlld, for example, at timing t64 (see FIG. 9), outputs a lowering instruction signal to the boost controller 6a. Then, the boost controller 6a shifts the full-charge threshold Vhl upward to set the full-charge threshold Vhl2 in a full-charge voltage shift period T4 between timings t5 and t64. After that, the boost controller 6a returns the full-charge threshold Vhl2 down to the original full-charge threshold Vhl by shifting down the full-charge threshold Vhl2 from timing t64 when the full-charge voltage shift period T4 has lapsed.

According to the present embodiment, the boost controller 6a stops the boost control of the booster circuit 4 (i) from timing when the power-supply interruption controller 6bb performs the interruption control (ii) until the processed value of the second-order differential voltage of the flyback voltage generated in the fuel injection valves 2a and 2b by the second-order differential processor 6i satisfies the predetermined condition. As a result, the same effect as that of the above-described embodiment is obtained.

Fifth Embodiment

Figure 10:
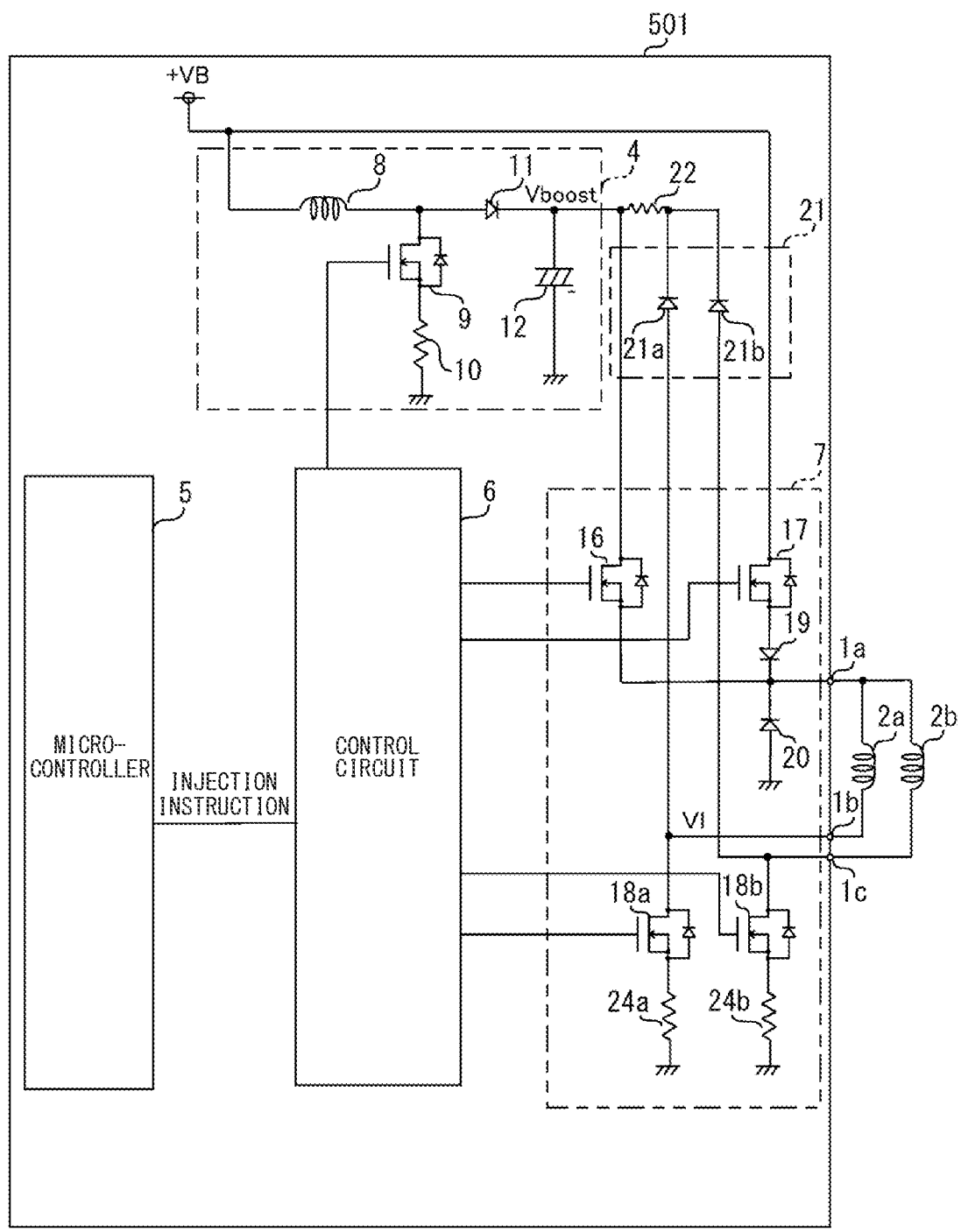
FIG. 10 is an electrical configuration diagram of the electronic control device according to a fifth embodiment.
Figure 11:
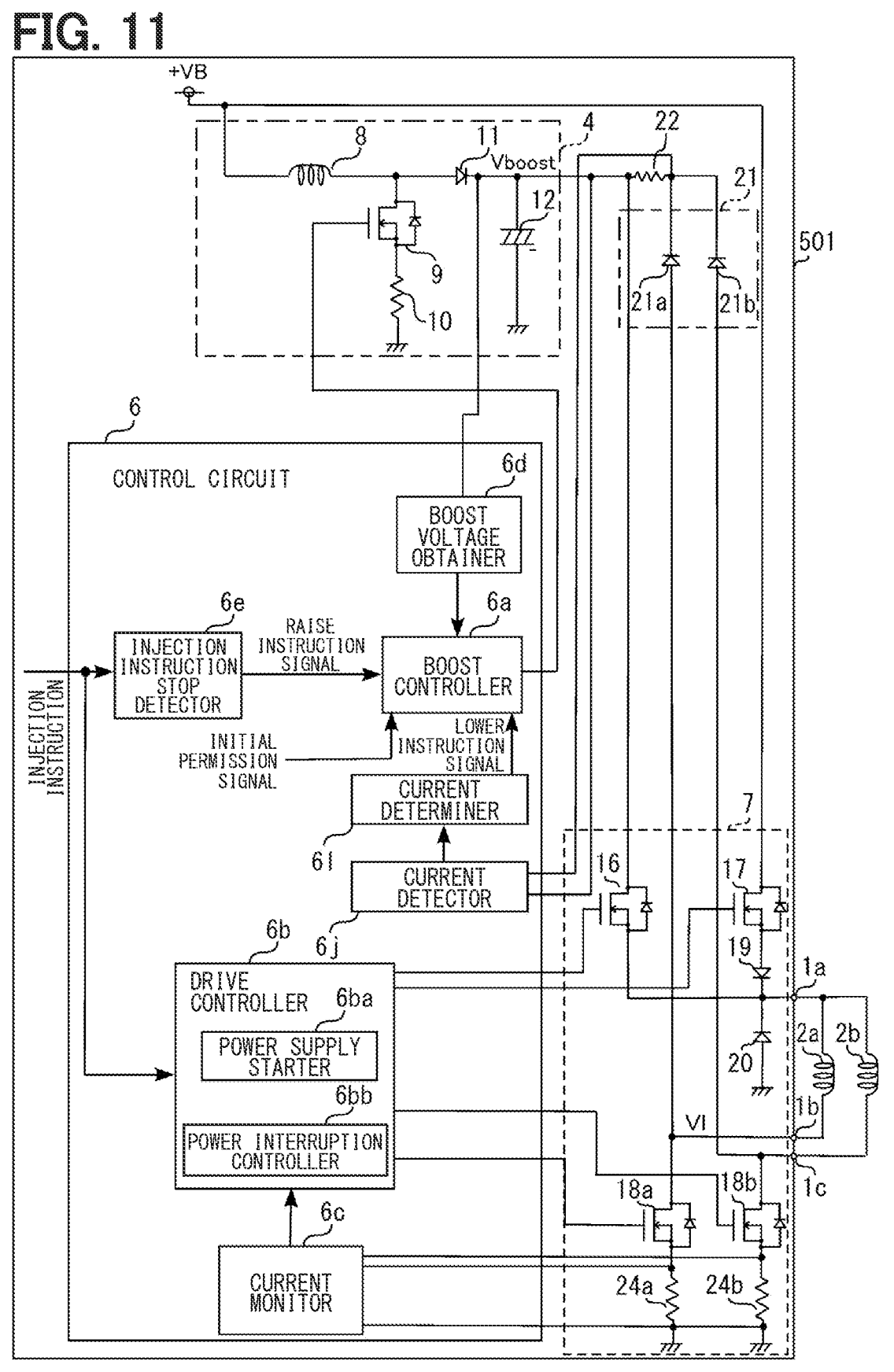
Figure 12:
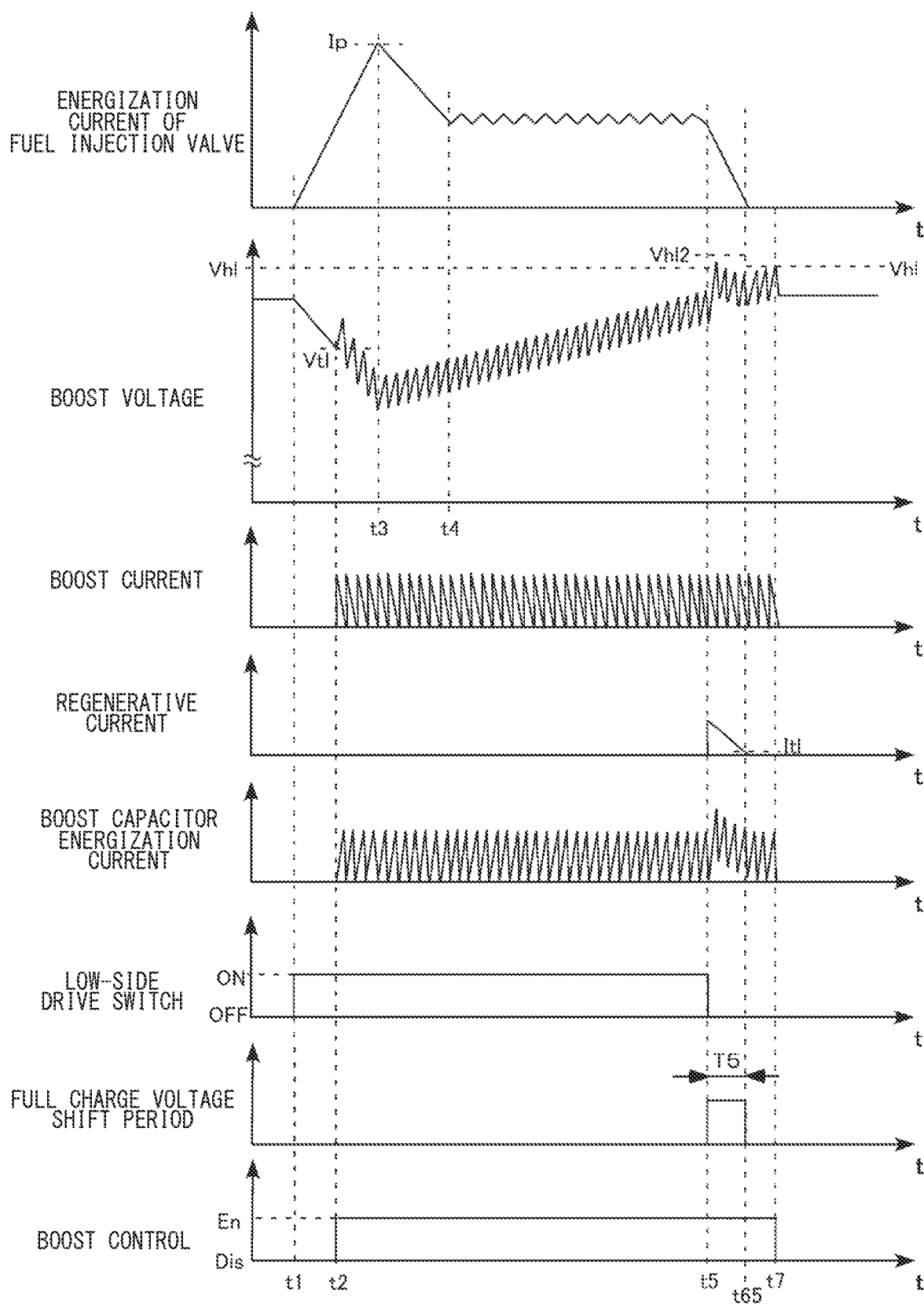
FIG. 12 is a timing chart schematically showing a signal change of each part according to the fifth embodiment.

FIGS. 10 to 12 show additional explanatory views of the fifth embodiment. As shown in FIG. 10, an electronic control device 501 of the fifth embodiment further includes an electric current detection resistor 22. As shown in FIG. 10, the electric current detection resistor 22 is provided in an energization path in which a regenerative current from the fuel injection valves 2a, 2b flows to the boost capacitor 12 through the diodes 21a, 21b, and is used to detect the regenerative current that occurs in the regeneration unit 21 when the power interruption controller 6bb performs the interruption control.

As illustrated in the control contents in FIG. 11, a current detector 6j of the control circuit 6 is configured to monitor the voltage across the electric current detection resistor 22. Here, the current monitor 6c and the current detector 6j are described as being provided separately, but one-body hardware configuration may be adopted, or a separate-body hardware configuration may be adopted. A current determiner 6l compares the regenerative current detected by the current detector 6j and a predetermined first current Itl and determines, and outputs a lowering instruction signal to the boost controller 6a based on the determination result.

As shown in FIG. 12, the regenerative current sharply increases and gradually decreases from timing t5 at which the control circuit 6 inputs the injection stop instruction and the power interruption controller 6bb performs the interruption control. After the injection instruction stop detector 6e outputs a raise instruction signal to the boost controller 6a at timing t5 in response to the injection stop instruction being input thereto, the current determiner 6l outputs a lowering instruction signal to the boost controller 6a at timing t65 when it is determined that the regenerative current detected by the current detector 6j falls below (reaches) the predetermined first current Itl (see FIG. 12). Then, the boost controller 6a shifts the full-charge threshold Vhl upward to set it to the full-charge threshold Vhl2 in a full-charge voltage shift period T5 between timings t5 and t65. After that, the boost controller 6a shifts the full-charge threshold Vhl2 downward to return to the original full-charge threshold Vhl from timing t65 when the full-charge voltage shift period T5 has lapsed.

According to the present embodiment, the full-charge threshold Vhl is shifted upward from timing when the power interruption controller 6bb performs the interruption control until the regenerative current of the regeneration unit 21 falls below the predetermined first current Itl. As a result, the same effect as that of the above-described embodiment is obtained.

Sixth Embodiment

Figure 13:
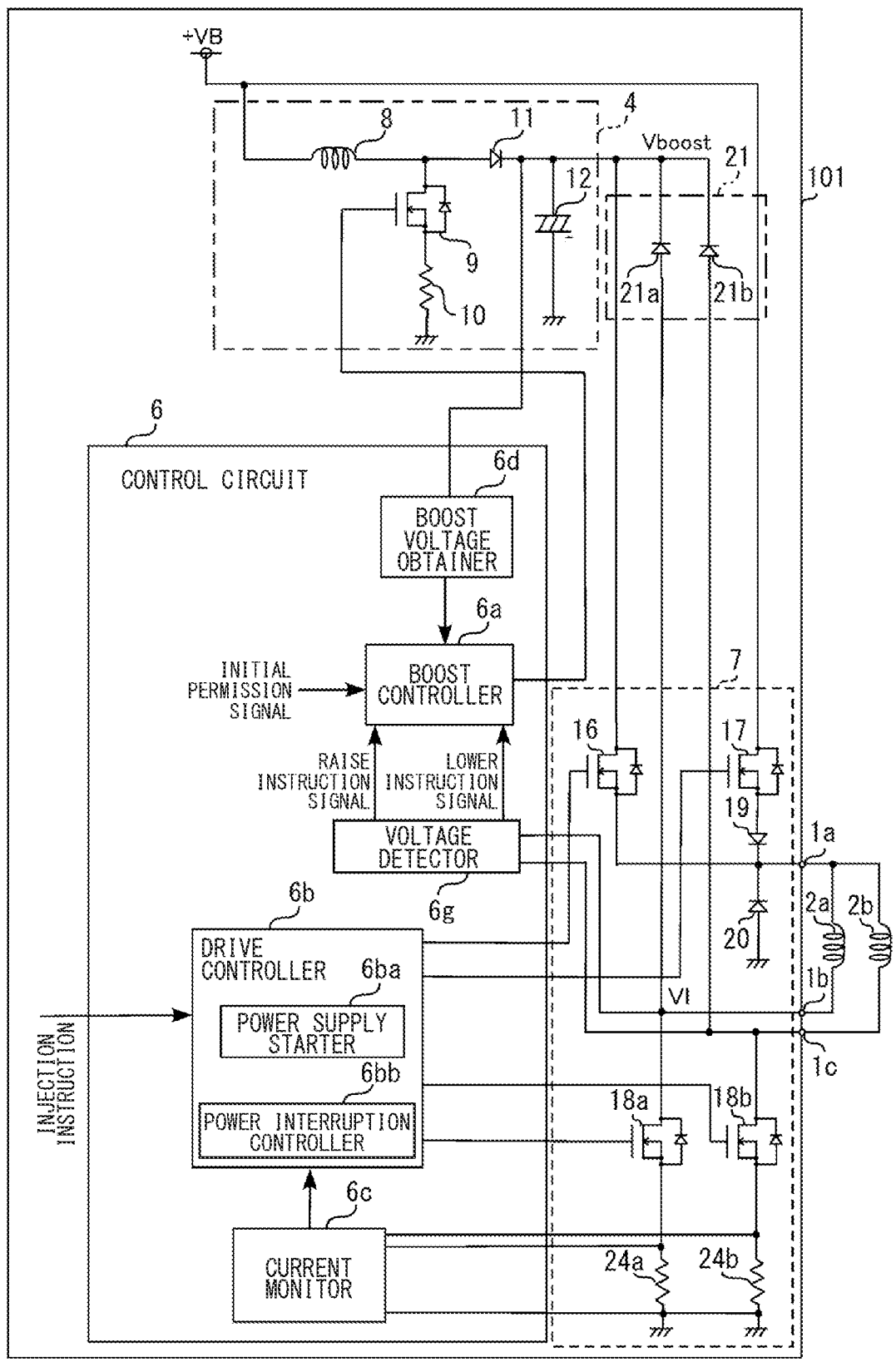
FIG. 13 is a diagram schematically illustrating the control contents in the control circuit according to a sixth embodiment.
Figure 14:
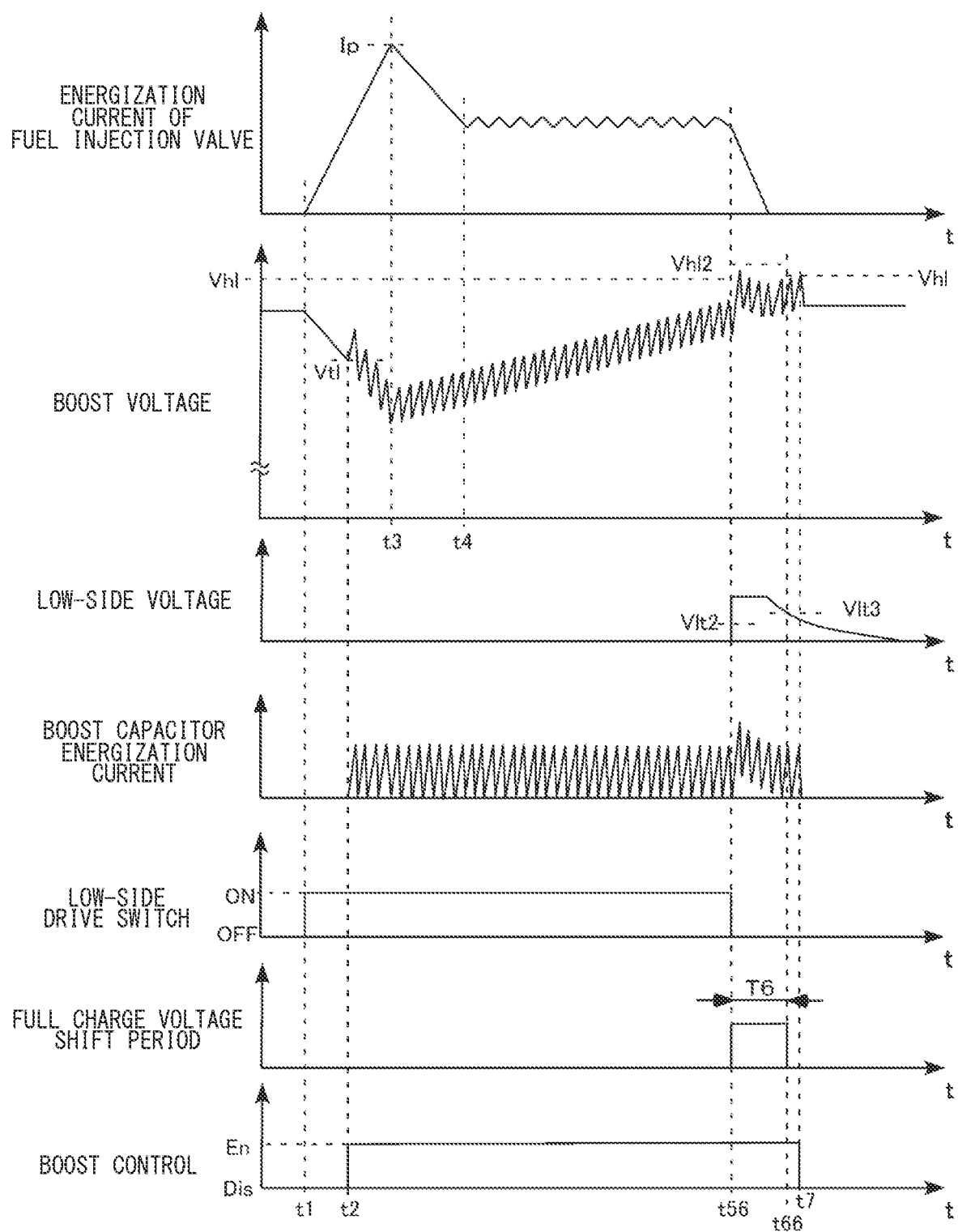
FIG. 14 is a timing chart schematically showing a signal change of each part according to the sixth embodiment.

FIGS. 13 and 14 show additional explanatory diagrams of the second embodiment. The same parts as those of the second embodiment are designated by the same reference numerals and the description thereof is omitted. Below, only the parts different from the second embodiment are described.

As shown in FIG. 13, the control circuit 6 includes the voltage detector 6g that detects the low-side voltage Vl of the low-side terminals 1b and 1c. The voltage detector 6g detects the flyback voltage generated in the fuel injection valves 2a and 2b when the interruption control by the power interruption controller 6bb is performed.

As shown in FIG. 14, the low-side voltage Vl of the low-side terminals 1b and 1c rises sharply from timing t56 when the control circuit 6 inputs the injection stop instruction and the interruption control is performed by the power interruption controller 6bb, and the low-side voltage Vl is saturated. After that, when the regenerative current stops flowing, the low-side voltage Vl also gradually decreases.

The voltage detector 6g outputs a raise instruction signal to the boost controller 6a by detecting that the low-side voltage Vl exceeds a predetermined second voltage Vlt2 at timing t56 (see FIG. 14). After that, the voltage detector 6g outputs a lowering instruction signal to the boost controller 6a by detecting at timing t66 (see FIG. 14) that the voltage has fallen below a third predetermined voltage Vlt3. Then, the boost controller 6a shifts the full-charge threshold Vhl upward to set it to the full-charge threshold Vhl2 in a full-charge voltage shift period T6 between timings t56 and t66. After that, the boost controller 6a shifts the full-charge threshold Vhl2 downward from timing t66 when a full-charge voltage shift period T6 has lapsed, to the original value, i.e., to the full-charge threshold Vhl.

According to the present embodiment, the boost controller 6a shifts the full-charge threshold Vhl upward from timing when the flyback voltage generated in the fuel injection valves 2a and 2b exceeds the predetermined second voltage Vlt2 until the flyback voltage falls below the predetermined third voltage Vlt3. As a result, the same effect as that of the above-described embodiment is obtained.

Seventh Embodiment

Figure 15:
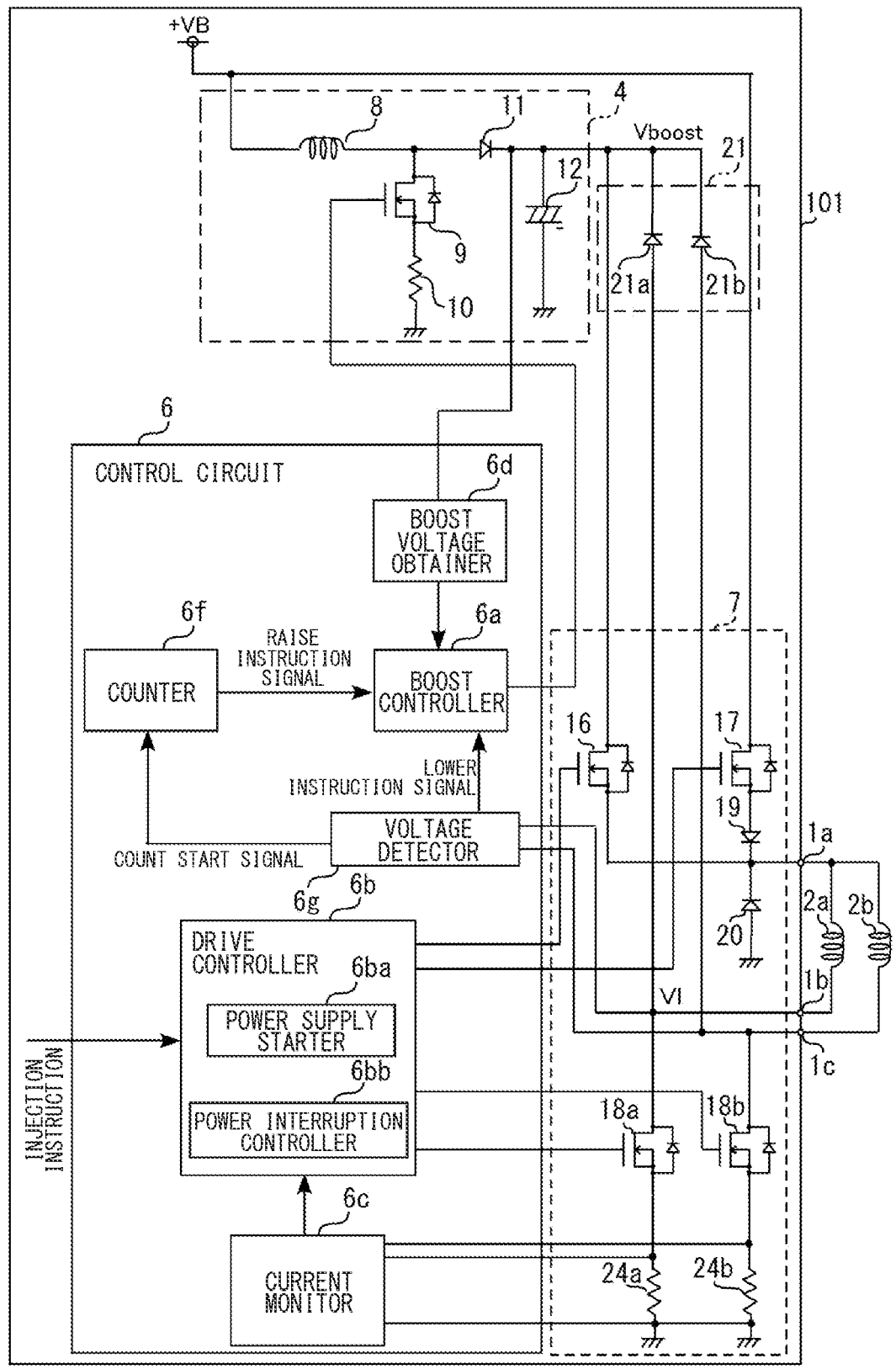
FIG. 15 is a diagram schematically illustrating the control contents in the control circuit according to a seventh embodiment.
Figure 16:
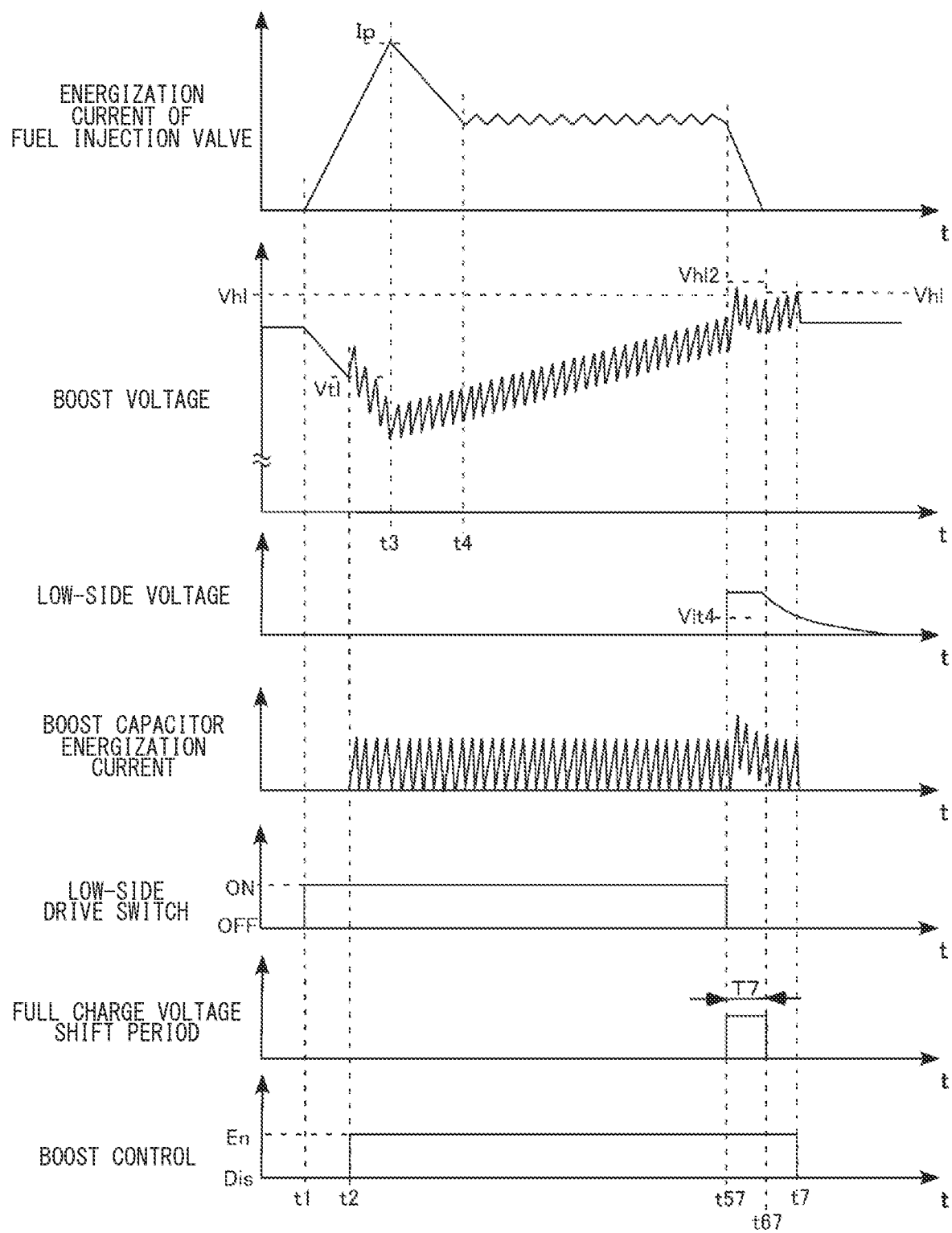
FIG. 16 is a timing chart schematically showing a signal change of each part according to the seventh embodiment.

FIGS. 15 and 16 show additional explanatory diagrams of the second embodiment. As shown in FIG. 15, the seventh embodiment includes the voltage detector 6g that detects the flyback voltage generated in the fuel injection valves 2a and 2b when the interruption control is performed by the power interruption controller 6bb. The same parts as those in the first embodiment are designated by the same reference numerals and the description thereof is omitted. Below, only the parts different from the above-mentioned embodiment is described.

As shown in FIG. 15, the control circuit 6 includes the voltage detector 6g that detects the low-side voltage Vl of the low-side terminals 1b and 1c. The voltage detector 6g detects a flyback voltage generated in the fuel injection valves 2a and 2b when the power interruption controller 6bb cuts off or interrupts a constant current. For example, the voltage detector 6g uses the low-side voltage Vl of the low-side terminals 1b and 1c to detect the flyback voltage.

As shown in FIG. 16, the low-side voltage Vl of the low-side terminals 1b and 1c sharply rises and saturates from timing t57 at which the control circuit 6 inputs the injection stop instruction and the power interruption controller 6bb performs interruption control. After that, while the regenerative current decreases, the low-side voltage Vl also gradually decreases.

When the injection instruction stop detector 6e inputs the injection stop instruction and the power interruption controller 6bb performs the interruption control, the low-side voltage Vl sharply rises at t57.

The voltage detector 6g, upon detecting that the low-side voltage Vl exceeds a predetermined fourth voltage Vlt4 at timing t57 (see FIG. 16), outputs a raise instruction signal to the boost controller 6a and outputs the count start signal to the counter 6f.

After that, the counter 6f outputs a lowering instruction signal to the boost controller 6a by detecting that a counter threshold is reached at timing t67 (see FIG. 16). Then, the boost controller 6a shifts the full-charge threshold Vh1 upward and sets it to the full-charge threshold Vh12 in a predetermined period T7 (corresponding to a predetermined second period,) between timings t57 and t67. After that, the boost controller 6a shifts the full-charge threshold Vh12 downward from timing t67 when the full-charge voltage shift period T7 has lapsed, to the original value, i.e., to the full-charge threshold Vh1.

According to the present embodiment, the boost controller 6a shifts the full-charge threshold Vh1 upward for a predetermined period T7, from timing when the flyback voltage generated in the fuel injection valve 2a exceeds the predetermined fourth voltage Vlt4 due to the interruption control performed by the power interruption controller 6bb. As a result, the same effect as that of the above-described embodiment is obtained.

Eighth Embodiment

Figure 17:
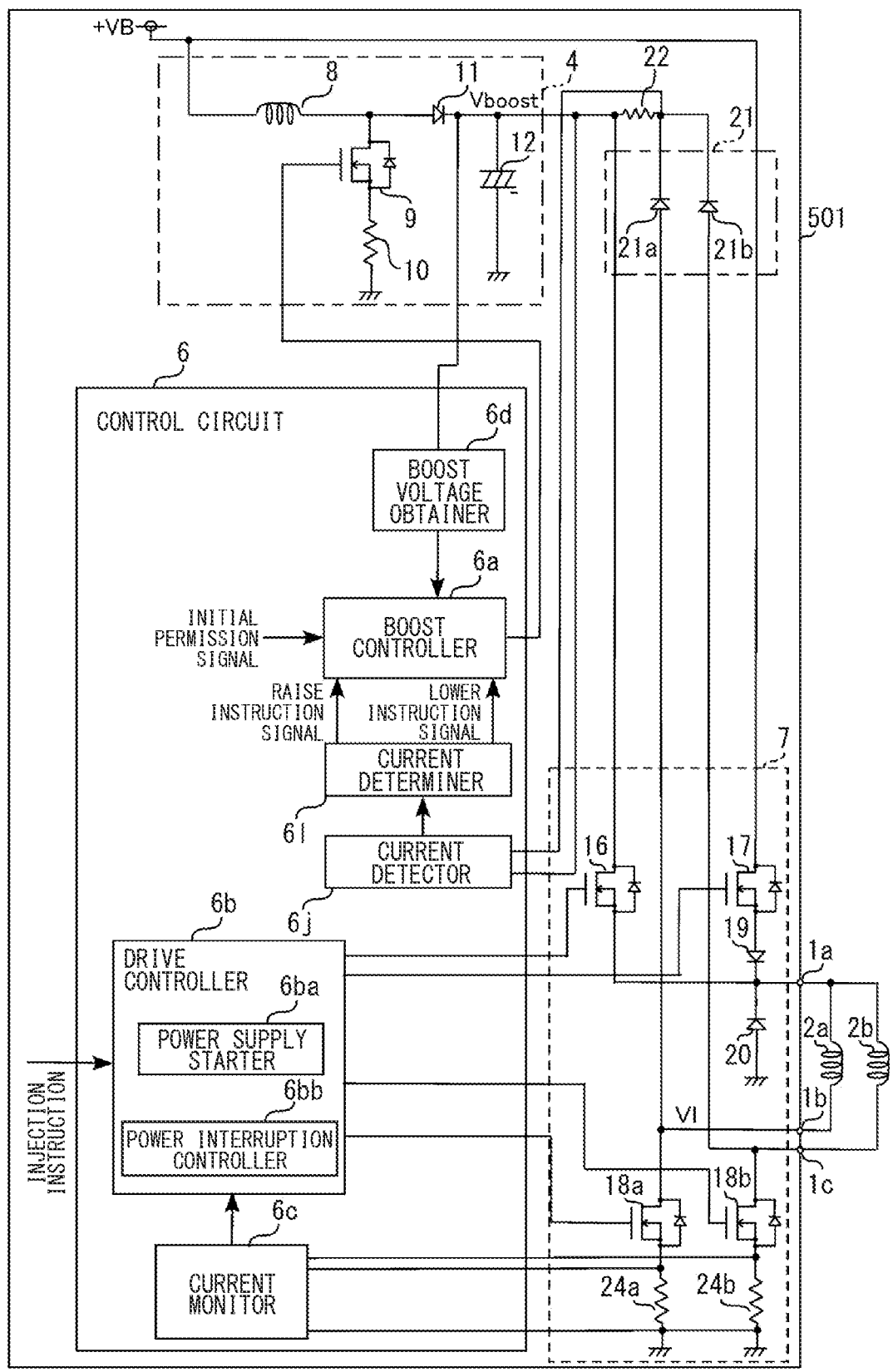
FIG. 17 is a diagram schematically illustrating the control contents in the control circuit according to an eighth embodiment.
Figure 18:
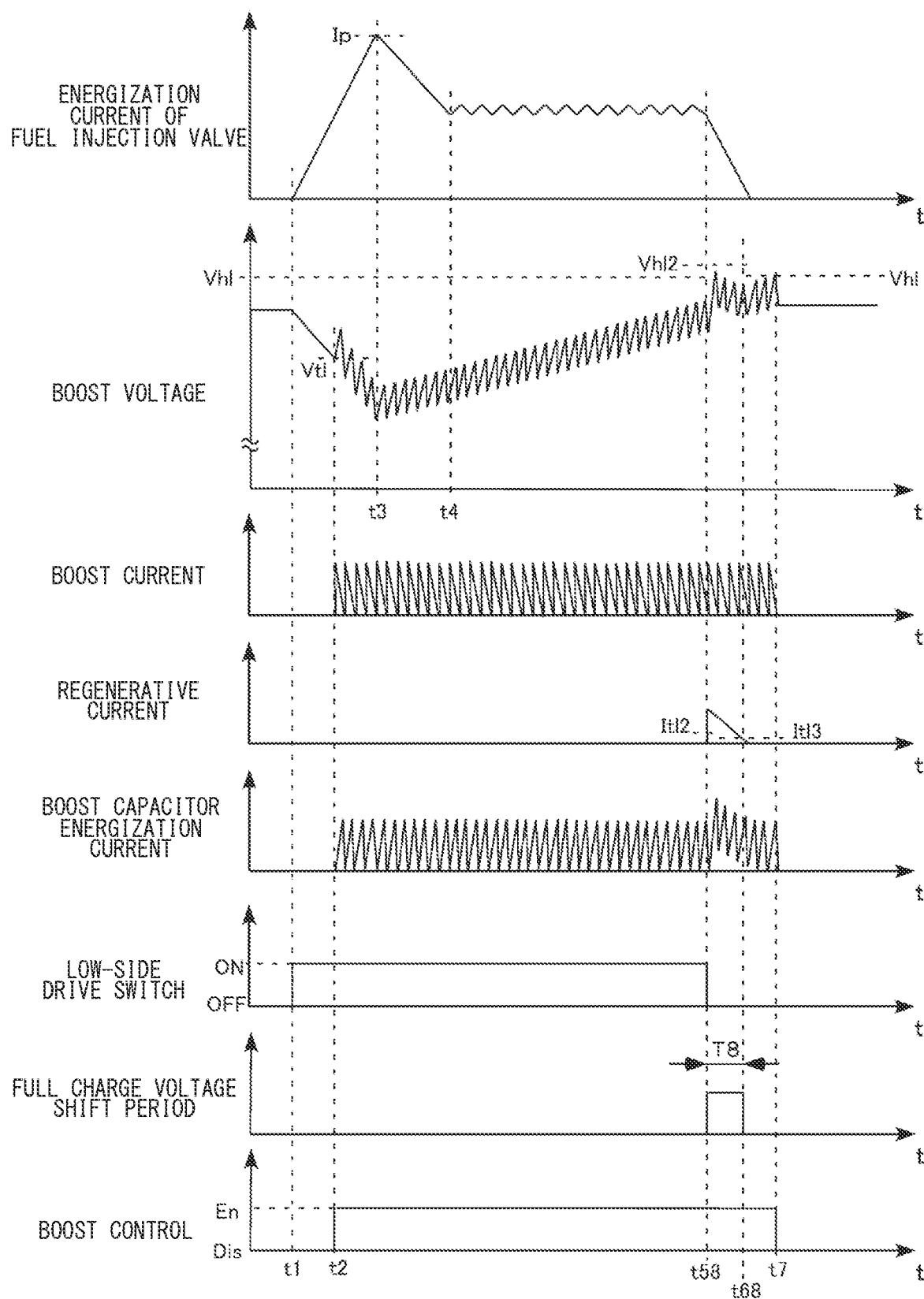
FIG. 18 is a timing chart schematically showing a signal change of each part according to the eighth embodiment.

FIGS. 17 and 18 show additional explanatory diagrams of the second embodiment. In the eighth embodiment, as shown in the electronic control device 501 of FIG. 10, the configuration including the electric current detection resistor 22 is used. The same parts as those in the above-described embodiment are designated by the same reference numerals, the description thereof is omitted, and different parts are described.

As shown in FIG. 10, the electric current detection resistor 22 is provided in an energization path in which a regenerative current from the fuel injection valves 2a and 2b flows to the boost capacitor 12 through the diodes 21a and 21b. As shown in FIG. 17, the current detector 6j of the control circuit 6 is provided to monitor the voltage across the electric current detection resistor 22. Here, the current monitor 6c and the current detector 6j are described as being provided separately, but the same hardware configuration may be adopted for both, or a different hardware configuration may be adopted respectively. The current determiner 6l compares the regenerative current detected by the current detector 6j with the predetermined second current It2 and a predetermined third current It3 and determines, and outputs a permission signal to the boost controller 6a based on the determination result. The predetermined second current It2 and the predetermined third current It3 may have the same value or different values.

As shown in FIG. 18, the regenerative current sharply increases and gradually decreases from timing t58 when the control circuit 6 inputs the injection stop instruction and the power interruption controller 6bb performs the interruption control. When the current determiner 6l detects at time t58 (see FIG. 18) that the regenerative current detected by the current detector 6j has exceeded (i.e., reached) the predetermined second current It2, the current determiner 6l outputs a raise instruction signal to the boost controller 6a. Then, the boost controller 6a shifts the full-charge threshold Vh1 upward to set it to the full-charge threshold Vh12.

After that, when the current determiner 6l detects that the regenerative current detected by the current detector 6j falls below (i.e., reaches) the predetermined third current It3 at timing t68 (see FIG. 18), the current determiner 6l outputs a lowering instruction signal to the boost controller 6a. Therefore, the boost controller 6a shifts the full-charge threshold Vh1 upward to set it to the full-charge threshold Vh12 in a full-charge voltage shift period T8 from timing t58 to timing t68. After that, the boost controller 6a shifts the full-charge threshold Vh12 downward to return to the original full-charge threshold Vh1 from timing t68 when the full-charge voltage shift period T8 has lapsed.

According to the present embodiment, the boost controller 6a shifts the full-charge threshold Vh1 upward from timing when the regenerative current of the regeneration unit 21 exceeds the predetermined second current It2 and falls below the predetermined third current It3. As a result, the same effect as that of the above-described embodiment is obtained.

Ninth Embodiment

Figure 19:
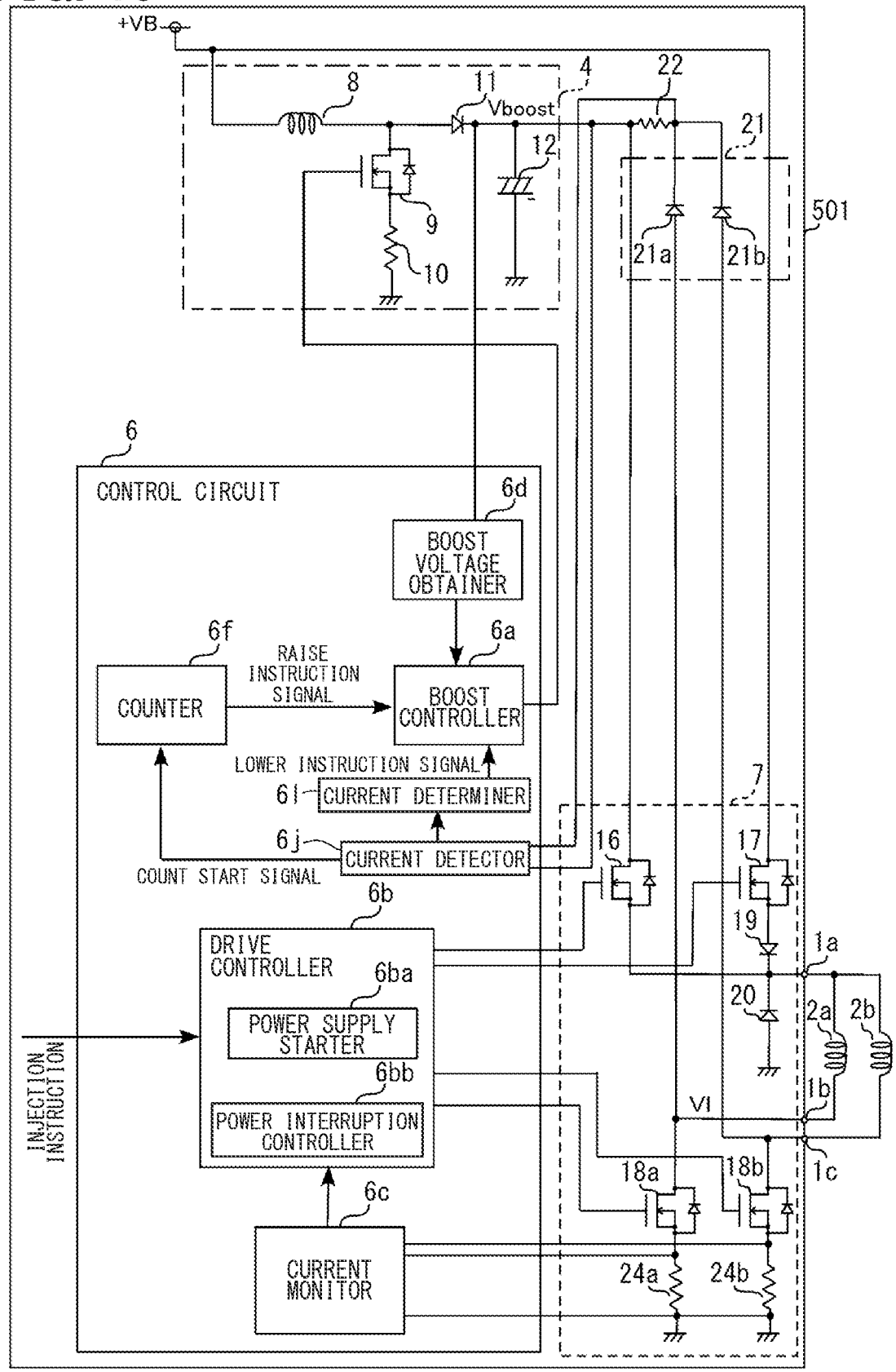
FIG. 19 is a diagram schematically illustrating the control contents in the control circuit according to a ninth embodiment.
Figure 20:
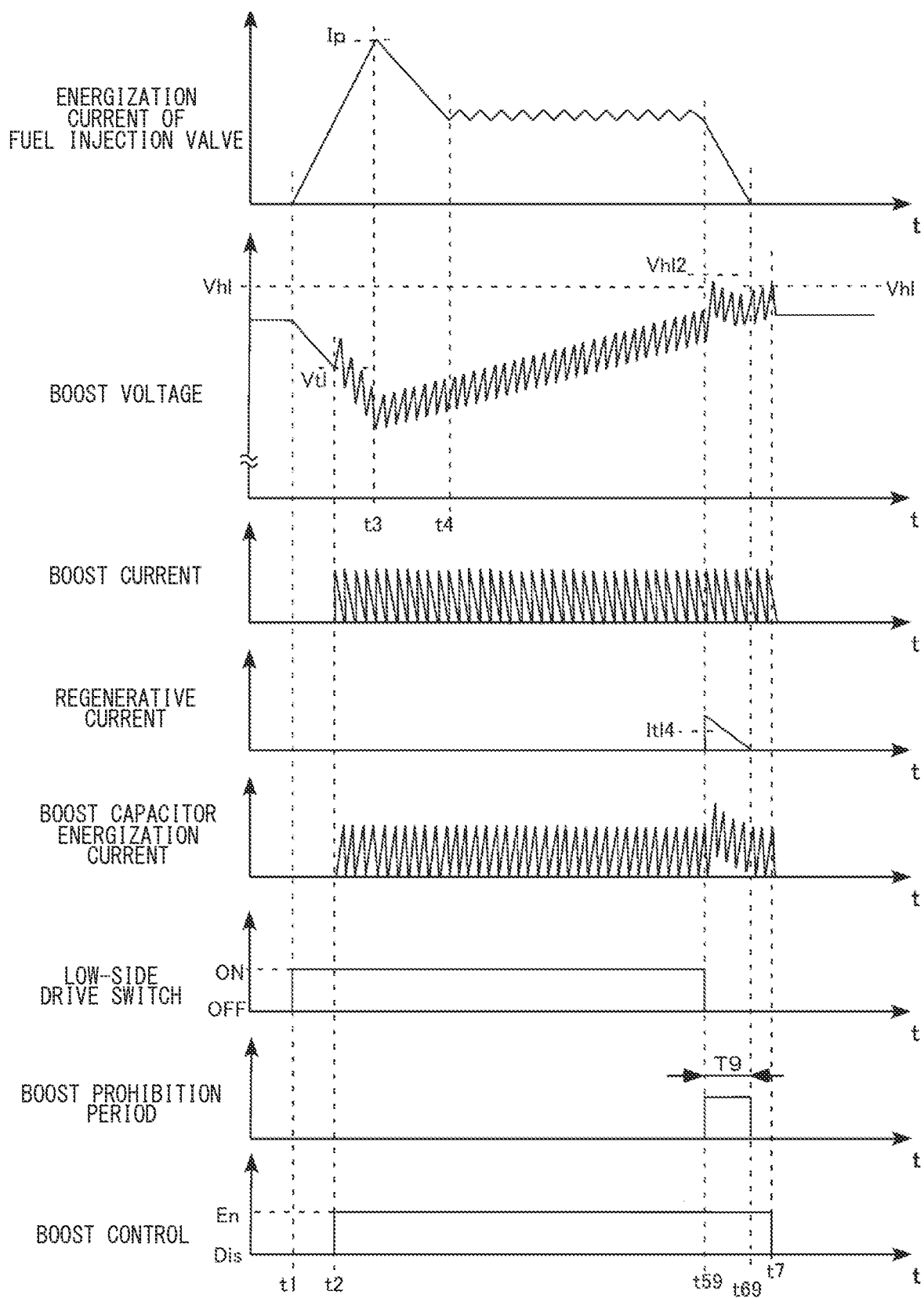
FIG. 20 is a timing chart schematically showing a signal change of each part according to the ninth embodiment.

FIGS. 19 and 20 show additional explanatory diagrams of the second embodiment. In the ninth embodiment, as shown in the electronic control device 501 of FIG. 10, the electric current detection resistor 22 that detects the regenerative current generated in the regeneration unit 21 when the power interruption controller 6bb performs the interruption control is provided. The same parts as those in the above-described embodiment are designated by the same reference numerals, the description thereof is omitted, and different parts are described.

As shown in FIG. 19, the current detector 6j of the control circuit 6 is configured to monitor the voltage across the electric current detection resistor 22. Here, the current monitor 6c and the current detector 6j are described as being provided separately, but the same hardware configuration may be adopted for both, or a different hardware configuration may be adopted respectively. The current determiner 6l compares the regenerative current detected by the current detector 6j with a predetermined fourth current It4, and determines, and outputs a raise instruction signal to the boost controller 6a based on the determination result.

As shown in FIG. 20, the regenerative current sharply increases and gradually decreases from timing t59 when the control circuit 6 inputs the injection stop instruction and the interruption control is performed by the power interruption controller 6bb. When the current determiner 6l detects at time t59 (see FIG. 20) that the regenerative current detected by the current detector 6j has exceeded (reached) the predetermined fourth current It4, the current determiner 6l outputs a raise instruction signal to the boost controller 6a, and outputs the count start signal to the counter 6f. Then, the boost controller 6a shifts the full-charge threshold Vh1 upward.

After that, when it is detected at timing t69 (see FIG. 20) that a predetermined period T9 (corresponding to the predetermined third period) has lapsed by counting by the counter 6f, a lowering instruction signal is output to the boost controller 6a. Therefore, the boost controller 6a shifts the full-charge threshold Vh1 upward to the full-charge threshold Vh12 in the predetermined period T9 from timing t59 to t69, but shifts the full-charge threshold Vh12 downward from timing t69 after the predetermined period T9 to return the threshold to the full-charge threshold Vh1.

According to the present embodiment, the boost controller 6a shifts the full-charge threshold Vh1 upward for a predetermined period T9 after the regenerative current of the regeneration unit 21 detected by the current detector 6j exceeds the predetermined fourth current It4. As a result, the same effect as that of the above-described embodiment is obtained.

Tenth Embodiment

Figure 21:
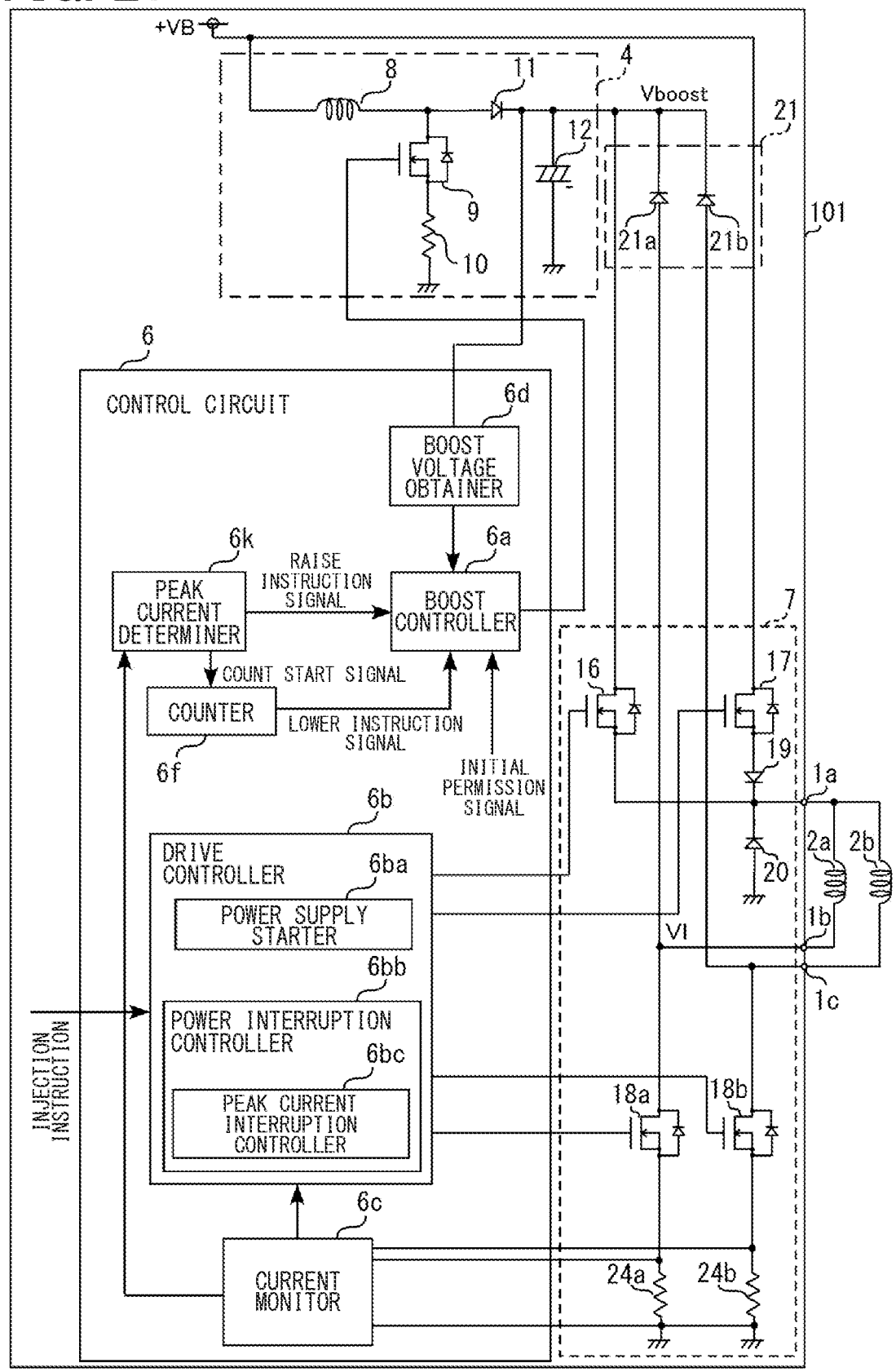
FIG. 21 is a diagram schematically illustrating the control content in the control circuit according to a tenth embodiment.
Figure 22:
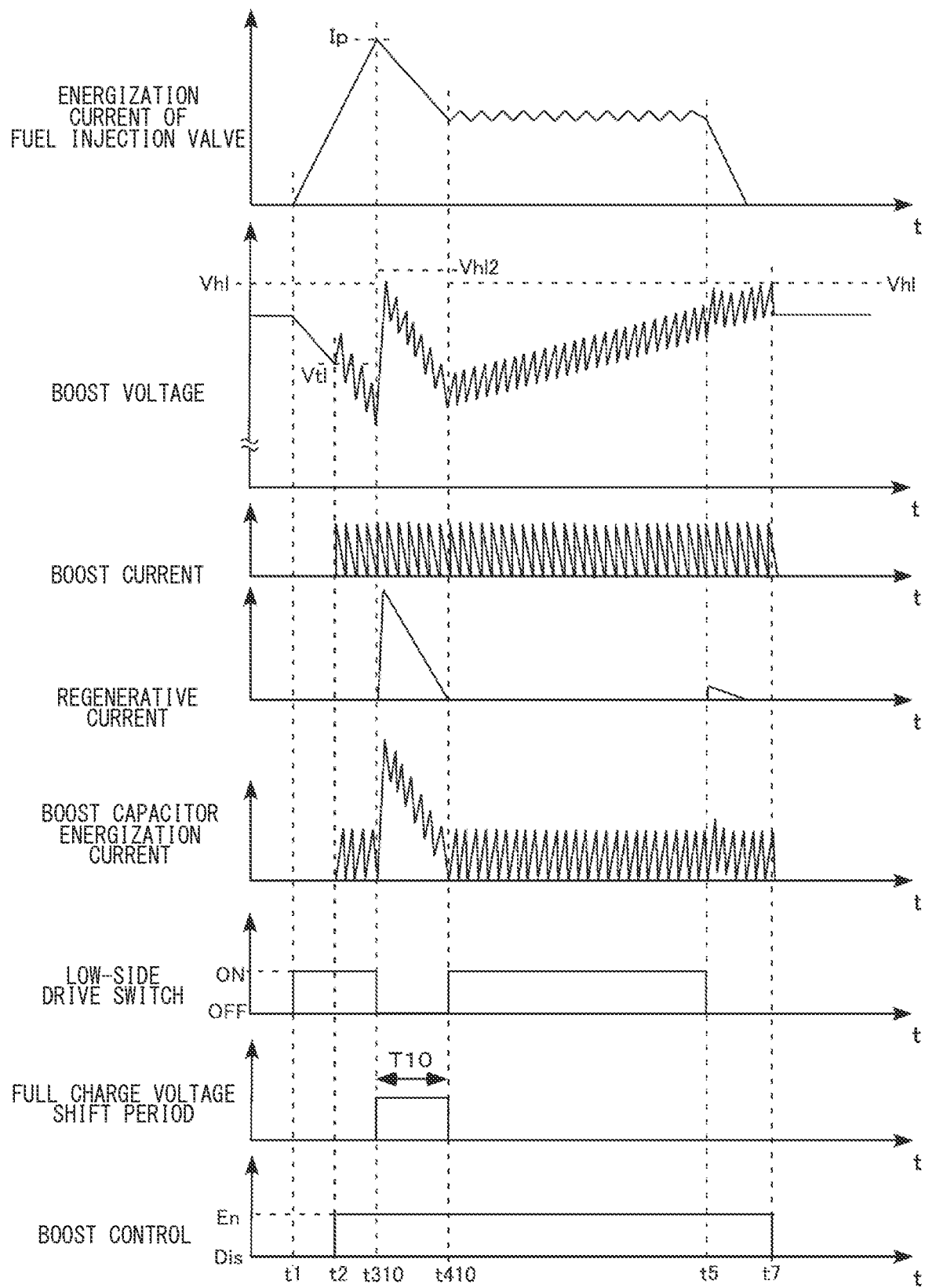
FIG. 22 is a timing chart schematically showing a signal change of each part according to the tenth embodiment.

FIGS. 21 and 22 show additional explanatory diagrams of the second embodiment. As shown in FIG. 21, the drive controller 6b includes the power supply starter 6ba and the power interruption controller 6bb. The power interruption controller 6bb includes a peak current interruption controller 6bc. In the following, the same parts as those in the above-described embodiment is designated by the same reference numerals and the description thereof is omitted, and different parts are described.

As shown in FIG. 21, the control circuit 6 includes a peak current determiner 6k. The peak current determiner 6k detects that the electric current flowing through the electric current detection resistors 24a and 24b has reached the peak current threshold Ip.

At timing t310 in FIG. 22, when the peak current determiner 6k determines that the energization current of the fuel injection valve 2a has reached the peak current threshold Ip, the peak current determiner 6k outputs a raise instruction signal to the boost controller 6a, and outputs a count start signal to the counter 6f, and notifies the drive controller 6b of such determination. Then, the drive controller 6b interrupts energization (i.e., supply of electric power) by turning OFF the discharge switch 16 and the low-side drive switches 18a and 18b by the peak current interruption controller 6bc in order to stop the peak current. The boost controller 6a shifts the full-charge threshold Vhl upward at timing t310 to set the full-charge threshold Vhl2.

On the other hand, the electric current based on the energy accumulated/stored in the fuel injection valve 2a flows through the reflux diode 20 to the low-side drive switch 18a and the electric current detection resistor 24a, and also to the diode 21a as a regenerative current. As a result, by supplying the regenerative current to the boost capacitor 12, the boosted voltage Vboost charged in the boost capacitor 12 can be increased, and the energy accumulated/stored in the fuel injection valve 2a can be reused.

When a count start signal is input, the counter 6f starts counting, and outputs a lowering instruction signal to the boost controller 6a at a timing t410 when a predetermined period T10 (corresponding to the predetermined first period) has lapsed. Then, the boost controller 6a shifts the full-charge threshold Vhl2 downward to return it to the full-charge threshold Vhl. After that, the boost controller 6a continues the boost control until the full-charge threshold Vhl is reached. The current threshold determined by the peak current determiner 6k does not necessarily have to match the peak current threshold Ip used by the peak current interruption controller 6bc as a threshold, and may be set smaller than the peak current threshold Ip.

In the present embodiment, when the power interruption controller 6bb stops the peak current under control of the drive controller 6b, the drive controller 6b interrupts supply of electric power by turning OFF the discharge switch 16 and the low-side drive switch 18a which release the voltage applied to the fuel injection valve 2a, and the boost controller 6a shifts the full-charge threshold Vhl upward for a predetermined period T10 from timing when the peak current interruption controller 6bc performs the interruption control. The drive controller 6b turns OFF the low-side drive switch 18a by the power interruption controller 6bb, thereby the regenerative current flows into the equivalent series resistor (ESR) of the boost capacitor 12, which causes a temporal rise of the boosted voltage Vboost. However, the boosted voltage Vboost is prevented from reaching the full-charge threshold Vhl even temporarily by the upward shift of the full-charge threshold Vhl to the full-charge threshold Vhl2. As a result, the same effect as that of the above-described embodiment is obtained.

(Modification)

The method of detecting and defining timings t310 and t410 is not limited to the method shown in the tenth embodiment. As the detection method and the defining method of timings t310 and t410 in the present embodiment, various methods related to timings t5 . . . t59, t6 . . . t69 described in the first to ninth embodiments can be applied correspondingly. That is, as functionally shown in FIG. 2, FIG. 4, FIG. 6, FIG. 8, FIG. 10, FIG. 11, FIG. 13, FIG. 15, FIG. 17, and FIG. 19 in the description of the first to ninth embodiments, if the control circuit 6 has each of those constituent elements, the same operation as described above can be performable.

Figure 23:
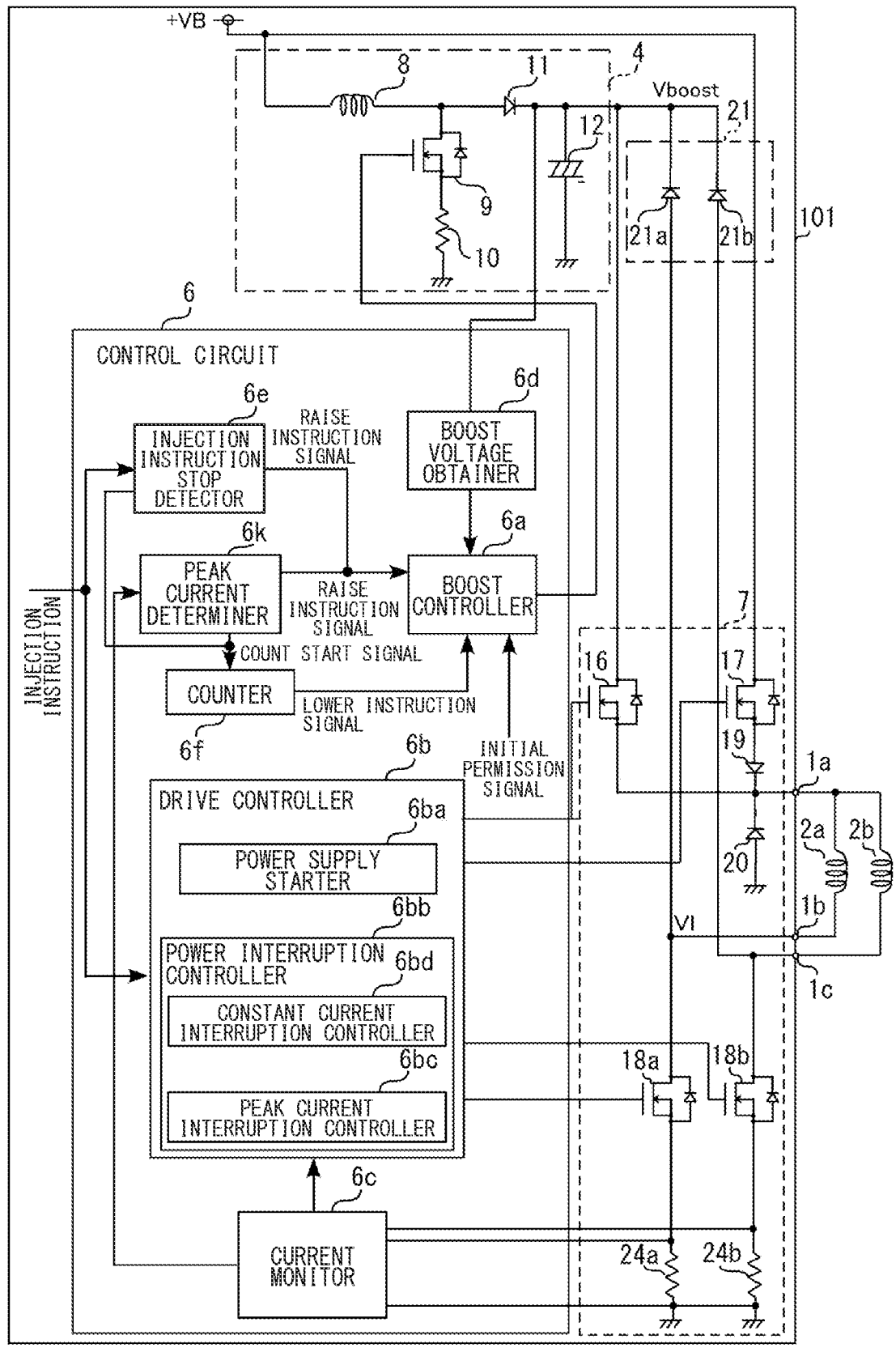
FIG. 23 is a diagram for schematically illustrating the control contents in the control circuit according to a modification.

Further, in addition to the configuration of the peak current determiner 6k shown in the tenth embodiment, if each of the constituent elements in the control circuit 6 in the description of the first to ninth embodiments is provided, the interruption control of power supply related to the constant current is performable at the same time as described above. For example, when the injection instruction stop detector 6e shown in the first embodiment is provided in combination, the control contents can be described as shown in FIG. 23. As shown in FIG. 23, the power interruption controller 6bb includes the peak current interruption controller 6bc and a constant current interruption controller 6bd. The constant current interruption controller 6bd interrupts the constant current.

Figure 24:
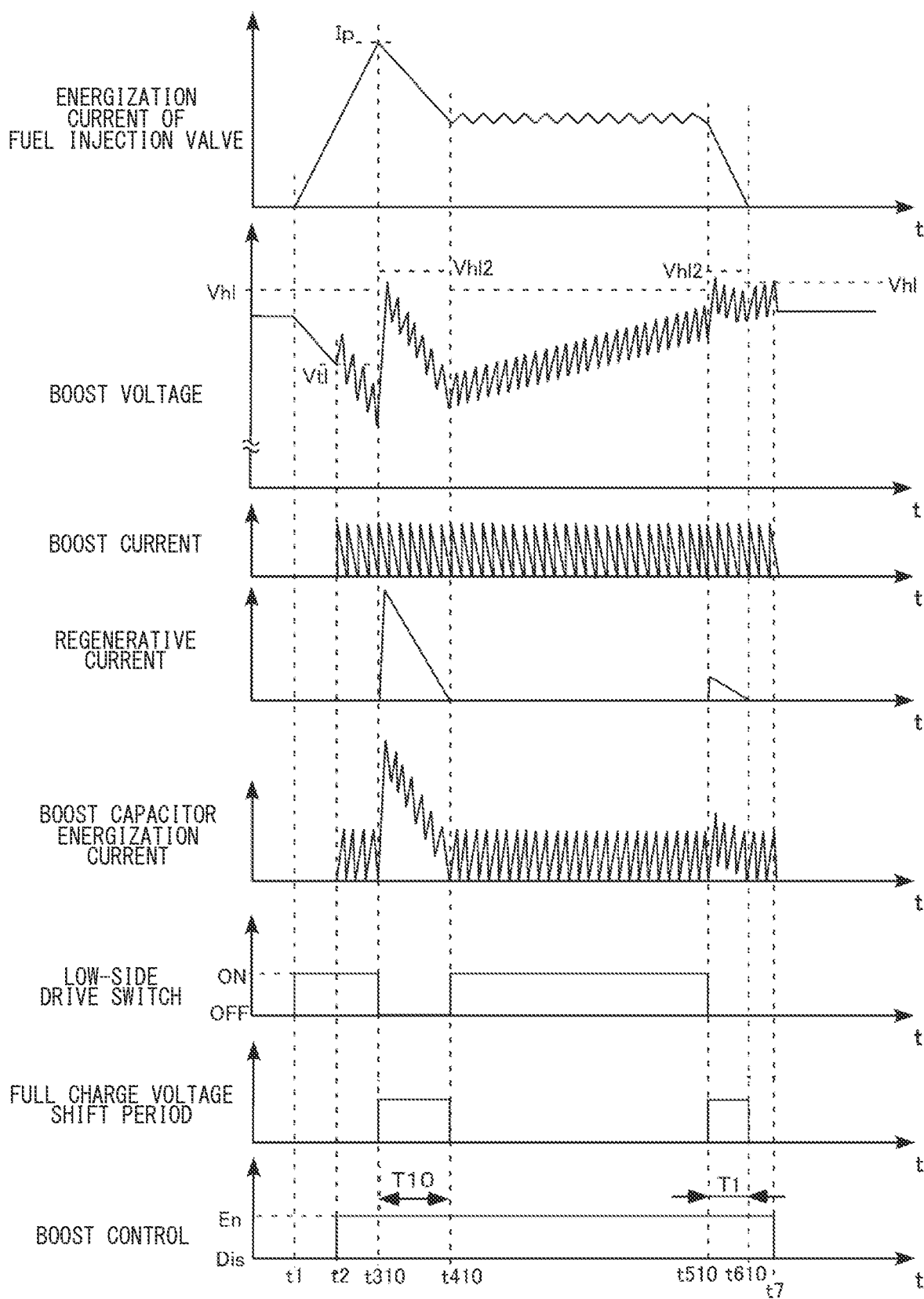
FIG. 24 is a timing chart schematically showing a signal change of each part according to the modification.

At timing t510 in FIG. 24, when the microcomputer 5 outputs an injection instruction stop signal of the fuel injection valve 2a to the control circuit 6, the injection instruction stop detector 6e detects the stop of the injection instruction and outputs a raise instruction signal to the boost controller 6a. At the same time, the count start signal is output to the counter 6f, thereby causing the counter 6f to start counting. The boost controller 6a shifts the full-charge threshold Vhl upward to set it to the full-charge threshold Vhl2.

Further, the constant current interruption controller 6bd of the drive controller 6b interrupts the constant current by turning OFF all, i.e., both of the constant current switch 17 and the low-side drive switch 18a. In such case, the energization current of the fuel injection valve 2a sharply decreases, and the magnetization of the stator provided in the fuel injection valve 2a can be stopped. As a result, a needle inside the fuel injection valve 2a, which is attracted by an electro-magnet of the stator, is returned to its original position by a biasing force of a biasing unit in response to the disappearance of the electromagnetic force, and as a result, the fuel injection valve 2a is closed.

At timing t510 in FIG. 24, electric current is being supplied to the fuel injection valve 2a, and electric energy is accumulated therein. The regeneration unit 21 can supply a regenerative current based on the accumulated/stored energy to the boost capacitor 12 through the reflux diode 20 and the diode 21a. The boosted voltage Vboost of the boost capacitor 12 is charged with electric energy based on the regenerative current of the regeneration unit 21, and the energy accumulated/stored in the fuel injection valve 2a can be reused.

On the other hand, the counter 6f continues counting, but when it reaches a predetermined count threshold, it outputs a lowering instruction signal to the boost controller 6a at timing t610. That is, the counter 6f outputs the lowering instruction signal to the boost controller 6a after the lapse of the predetermined first period T1 from timing t510 to timing t610. The boost controller 6a restores the full-charge threshold Vhl by downwardly shifting the full-charge threshold Vhl2. As described above, the control contents of the first embodiment can be combined in the present embodiment. The control contents of the second to ninth embodiments can also be combined with the control contents of the tenth embodiment, but the description thereof is omitted.

Other Embodiments

The present disclosure should not be limited to the embodiments described above, and various modifications may further be implemented without departing from the gist of the present disclosure. For example, the following modifications or extensions are possible. The plurality of embodiments described above may be combined as necessary.

In the above-described embodiment, the control method for the one fuel injection valve 2a has been described as an example, but the present disclosure is not limited to such a scheme, and the control method of the one fuel injection valve 2a can be applied to the control method for the other fuel injection valve 2b.

Although the above-described electronic control devices 1 and 501 have been described as used in a mode in which the constant current control is performed after detecting the peak current threshold Ip of the energizing current of the fuel injection valve 2a, the present disclosure is not limited to such a scheme. For example, the present disclosure can be applied to a control in which the detection of the peak current threshold Ip is used as a trigger to interrupt the constant current control thereafter. Further, for example, the present disclosure can be applied to a control that performs only the constant current control described above without performing the detection and control of the peak current threshold Ip for opening the valve. That is, the present disclosure can be similarly applied to a case where at least one of the interruption control triggered by detecting the peak current threshold Ip and the interruption control after performing the constant current control.

Further, in the above embodiment, the fuel injection valves 2a and 2b for two cylinders are described for simplification of the description, but the same applies to the case of other number of cylinders such as four cylinders and six cylinders for performing the same contents. Further, the configuration of the drive unit 7 is not limited to the configuration shown in the above-described embodiment, and may be changed as appropriate.

In the above-described embodiment, the discharge switch 16, the constant current switch 17, and the low-side drive switches 18a and 18b have been described by using MOS transistors, but other types of transistors such as bipolar transistors and various switches may also be used.

In the description of the above-described embodiment, although the current monitor 6c, the boost voltage obtainer 6d, the voltage detector 6g, the current detector 6j, and the peak current determiner 6k may be implemented as hardware such as a comparator and an A/D converter, they, i.e., at least two or more of those components, may also be implemented as one, common component or may be implemented separately.

The microcomputer 5 and the control circuit 6 may be integrated or separated, and various control devices may be used instead of the microcomputer 5 and the control circuit 6. The means and/or functions provided by the control device can be provided by software recorded in a substantive memory device and a computer, software, hardware, or a combination thereof that executes the software. For example, when the control device is provided by an electronic circuit that is hardware, it can be configured by a digital circuit or an analog circuit including one or a plurality of logic circuits. Further, for example, when the control device implements various controls by using software, a program is stored in a storage unit, and a method corresponding to the program is performed by the control subject (i.e., by a device) that executes such program.

Two or more embodiments described above may be combined to implement the control of the present disclosure. In addition, the reference numerals in parentheses described in the claims simply indicate correspondence to the concrete means described in the embodiments, which is an example of the present disclosure. That is, the technical scope of the present disclosure is not necessarily limited thereto. A part of the above-described embodiment may be dispensed/dropped as long as the problem identified in the background is resolvable. In addition, various modifications from the present disclosure in the claims are considered also as an embodiment thereof as long as such modification pertains to the gist of the present disclosure.

Although the present disclosure has been described based on the above-described embodiments, it is understood that the present disclosure is not limited to the embodiments and structures. The present disclosure also includes various modifications and the equivalents. In addition, various combinations and forms, and other combinations and forms including one or more elements, or less than one element are also included in the scope and concept of the present disclosure.

The predetermined first voltage Vlt in FIG. 5 is descriptively known as a threshold terminating low-side voltage, because it is used to terminate the full charge voltage shift period T2.

The predetermined first current Itl in FIG. 12 is descriptively known as a threshold terminating regenerative current, because it is used to terminate the full charge voltage shift period T5.

The predetermined second voltage Vlt2 in FIG. 14 is descriptively known as a threshold initiating low-side voltage because it is used to initiate the full charge voltage shift period T6.

The predetermined third voltage Vlt3 in FIG. 14 is descriptively known as a threshold terminating low-side voltage, because it is used to terminate the full charge voltage shift period T6. Note that this descriptive name is also used for the predetermined first voltage Vlt in FIG. 5, as discussed above. Both of these voltages serve the same function.

The predetermined fourth voltage Vlt4 in FIG. 16 is descriptively known as a threshold initiating low-side voltage, because it is used to initiate the predetermined time period T7.

The predetermined second current Itl2 in FIG. 18 is descriptively known as the threshold initiating regenerative current, because it is used to initiate the full charge voltage shift period T8.

The predetermined third current Itl3 in FIG. 18 is descriptively known as a threshold terminating regenerative current, because it is used to terminate the full charge voltage shift period T8.

The predetermined fourth current Itl4 in FIG. 20 is descriptively known as a threshold initiating regenerative current, because it is used to initiate the predetermined period T9.

What is claimed is:

1. An injection control device for controlling injection by supplying an electric current to a fuel injection valve, the injection control device comprising:
   a booster circuit boosting a battery voltage to generate a boosted voltage in a boost capacitor;
   a boost controller configured to perform boost control by the booster circuit until the boosted voltage rises to a full-charge threshold when the boosted voltage falls below a charge start threshold;
   a drive unit supplying the electric current to the fuel injection valve with the boosted voltage or the battery voltage;
   a power interruption controller configured to interrupt the electric current supplied by the drive unit to the fuel injection valve; and
   a regeneration unit regenerating the electric current generated in the fuel injection valve to the boost capacitor of the booster circuit, generation of the electric current caused by interruption control of the power interruption controller, wherein
   the boost controller is configured to upward-shift the full-charge threshold of the booster circuit in a period of when at least the electric current is regenerated by the regeneration unit to the boost capacitor of the booster circuit after the power interruption controller interrupts the electric current.

2. The injection control device according to claim 1, wherein
   the power interruption controller performs the interruption control as at least one of:
   interruption of a peak current supplied to the fuel injection valve by an application of the boosted voltage to the fuel injection valve by the drive unit, or
   interruption of a constant current supplied to the fuel injection valve by an application of the battery voltage to the fuel injection valve by the drive unit.

3. The injection control device according to claim 1, wherein
   the boost controller performs the upward shift of the full-charge threshold of the booster circuit in a predetermined first period from the interruption control performed by the power interruption controller.

4. The injection control device according to claim 1 further comprising:
   a voltage detector detecting a flyback voltage generated in the fuel injection valve when the interruption control is performed by the power interruption controller, wherein
   the boost controller performs the upward shift of the full-charge threshold of the booster circuit in a period from the interruption control performed by the power interruption controller
   to a fall of the flyback voltage generated in the fuel injection valve caused by the interruption control below a predetermined first voltage, the fall thereof detected by the voltage detector.

5. The injection control device according to claim 1 further comprising:
   a voltage detector detecting a flyback voltage generated in the fuel injection valve when the interruption control is performed by the power interruption controller, and
   a differential processor differentiating the flyback voltage once or twice, wherein
   the boost controller performs the upward shift of the full-charge threshold of the booster circuit in a period from the interruption control performed by the power interruption controller
   to a satisfaction of a predetermined condition by a differential processor processed value of the flyback voltage that is generated in the fuel injection valve caused by the interruption control below a predetermined first voltage, the satisfaction thereof detected by the voltage detector.

6. The injection control device according to claim 1 further comprising:
   a current detector detecting a regenerative current generated in the regeneration unit when the power interruption controller performs the interruption control, wherein
   the boost controller performs the upward shift of the full-charge threshold of the booster circuit in a period from the interruption control performed by the power interruption controller
   to a decrease of the regenerative current generated in the regeneration unit below a predetermined first current.

7. The injection control device according to claim 1 further comprising:
   a voltage detector detecting a flyback voltage generated in the fuel injection valve when the interruption control is performed by the power interruption controller, and
   the boost controller performs the upward shift of the full-charge threshold of the booster circuit in a period from a rise of the flyback voltage generated in the fuel injection valve above a threshold initiating low-side voltage, the rise caused by the interruption control performed by the power interruption controller
   to a fall of the flyback voltage below a predetermined threshold terminating low-side voltage.

8. The injection control device according to claim 1 further comprising:
   a voltage detector detecting a flyback voltage generated in the fuel injection valve when the interruption control is performed by the power interruption controller, and
   the boost controller performs the upward shift of the full-charge threshold of the booster circuit in a predetermined second period from a rise of the flyback voltage generated in the fuel injection valve above a predetermined threshold initiating low-side voltage, the rise caused by the interruption control performed by the power interruption controller.

9. The injection control device according to claim 1 further comprising:
   a current detector detecting a regenerative current generated in the regeneration unit when the power interruption controller performs the interruption control, wherein
   the boost controller performs the upward shift of the full-charge threshold of the booster circuit in a period from an increase of the regenerative current generated in the regeneration unit above a threshold initiating regenerative current,
   to a decrease thereof below a threshold terminating regenerative current.

10. The injection control device according to claim 1 further comprising:
a current detector detecting a regenerative current generated in the regeneration unit when the power interruption controller performs the interruption control, wherein
the boost controller performs the upward shift of the full-charge threshold of the booster circuit in a predetermined period from an increase of the regenerative current generated in the regeneration unit above a threshold initiating regenerative current.

11. An injection control device comprising:
a control circuit;
a booster circuit configured to generate a boost voltage, and including: a boost inductor, a boost switch, a boost resister, a boost diode, and a boost capacitor;
a regenerative circuit configured to pass a regenerative current towards the booster circuit;
a discharge switch located electrically between the booster circuit and a fuel injection valve;
a constant current switch located electrically between a battery voltage and the fuel injection valve;
a high-side terminal configured for connection to a fuel injection valve;
a low-side terminal configured for connection to a low side of the fuel injection valve, and associated with a low-side voltage;
a low-side drive switch; and
a current detection resistor configured to receive current from the low-side drive switch,
wherein the control circuit is configured to:
start charging the boost capacitor by switching the boost switch when the boost voltage is equal to or smaller than a predetermined charge start threshold;
stop charging the boost capacitor by switching the boost switch when the boost voltage is equal to or greater than a full-charge threshold;
wherein the full-charge threshold has a shifted value during a shift period, and has a non-shifted value outside of the shift period;
wherein the shifted value is greater than the non-shifted value; and
wherein the shift period ends when at least one of the following conditions is satisfied:
(i) a predetermined first period has passed after beginning the shift period;
(ii) a low-side voltage measured at the low-side terminal is equal to or smaller than a threshold terminating low-side voltage;
(iii) a first-order differential value of the low-side voltage is equal to or smaller than a predetermined first-order negative threshold;
(iv) a second-order differential value of the low-side voltage is equal to or smaller than a predetermined second-order negative threshold; and
(v) the regenerative current is equal to or smaller than a threshold terminating regenerative current.

12. An injection control device comprising:
a control circuit;
a booster circuit configured to generate a boost voltage, and including: a boost inductor, a boost switch, a boost resister, a boost diode, and a boost capacitor;
a regenerative circuit configured to pass a regenerative current towards the booster circuit;
a discharge switch located electrically between the booster circuit and a fuel injection valve;
a constant current switch located electrically between a battery voltage and the fuel injection valve;
a high-side terminal configured for connection to a fuel injection valve;
a low-side terminal configured for connection to a low side of the fuel injection valve, and associated with a low-side voltage;
a low-side drive switch; and
a current detection resistor configured to receive current from the low-side drive switch,
wherein the control circuit is configured to:
(i) start charging the boost capacitor by switching the boost switch when the boost voltage is equal to or smaller than a predetermined charge start threshold; and
(ii) stop charging the boost capacitor by switching the boost switch when the boost voltage is equal to or greater than a full-charge threshold;
wherein the full-charge threshold has a shifted value during a shift period, and has a non-shifted value outside of the shift period;
wherein the shifted value is greater than the non-shifted value; and
wherein the shift period begins when at least one of the following conditions is satisfied:
(i) an injection instruction stop signal turns OFF the low-side drive switch;
(ii) the low-side voltage is equal to or greater than a threshold initiating low-side voltage;
(iii) the regenerative current is equal to or greater than a threshold initiating regenerative current.

13. The injection control device according to claim 12, wherein the shift period ends when at least one of the following conditions is satisfied:
(i) a predetermined first period has passed after beginning the shift period;
(ii) a low-side voltage measured at the low-side terminal is equal to or smaller than a threshold terminating low-side voltage;
(iii) a first-order differential value of the low-side voltage is equal to or smaller than a predetermined first-order negative threshold;
(iv) a second-order differential value of the low-side voltage is equal to or smaller than a predetermined second-order negative threshold; and
(v) the regenerative current is equal to or smaller than a threshold terminating regenerative current.

14. The injection control device according to claim 13, wherein
the shift period ends based at least partly on the following condition being satisfied:
(i) the predetermined first period has passed after beginning the shift period.

15. The injection control device according to claim 13, wherein the shift period ends based at least partly on the following condition being satisfied:
(ii) the low-side voltage measured at the low-side terminal is equal to or smaller than the threshold terminating low-side voltage.

16. The injection control device according to claim 13, wherein the shift period ends based at least partly on the following condition being satisfied:
(iii) the first-order differential value of the low-side voltage is equal to or smaller than the predetermined first-order negative threshold.

17. The injection control device according to claim 13, wherein the shift period ends based at least partly on the following condition being satisfied:
  (iv) the second-order differential value of the low-side voltage is equal to or smaller than the predetermined second-order negative threshold.

18. The injection control device according to claim 13, wherein the shift period ends based at least partly on the following condition being satisfied:
  (v) the regenerative current is equal to or smaller than the threshold terminating regenerative current.

* * * * *